United States Patent
Sindhu

(10) Patent No.: US 10,382,362 B2
(45) Date of Patent: *Aug. 13, 2019

(54) NETWORK SERVER HAVING HARDWARE-BASED VIRTUAL ROUTER INTEGRATED CIRCUIT FOR VIRTUAL NETWORKING

(71) Applicant: Juniper Networks, Inc., Sunnyvale, CA (US)

(72) Inventor: Pradeep Sindhu, Los Altos Hills, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/953,112

(22) Filed: Apr. 13, 2018

(65) Prior Publication Data
US 2018/0241696 A1    Aug. 23, 2018

Related U.S. Application Data

(63) Continuation of application No. 15/281,021, filed on Sep. 29, 2016, now Pat. No. 9,954,798, which is a
(Continued)

(51) Int. Cl.
*H04L 12/937* (2013.01)
*H04L 12/931* (2013.01)
(Continued)

(52) U.S. Cl.
CPC ........ *H04L 49/253* (2013.01); *H04L 12/4633* (2013.01); *H04L 45/64* (2013.01);
(Continued)

(58) Field of Classification Search
None
See application file for complete search history.

(56) References Cited

U.S. PATENT DOCUMENTS

| 5,027,354 A | 6/1991 | Ara et al. |
| 5,251,205 A | 10/1993 | Callon et al. |

(Continued)

FOREIGN PATENT DOCUMENTS

| CN | 1791054 A | 6/2006 |
| CN | 1913482 A1 | 2/2007 |

(Continued)

OTHER PUBLICATIONS

Search Report from counterpart European Application No. 15160086.3, dated Dec. 17, 2015, 13 pp.
(Continued)

*Primary Examiner* — Candal Elpenord
(74) *Attorney, Agent, or Firm* — Shumaker & Sieffert, P.A.

(57) ABSTRACT

A high-performance, scalable and drop-free data center switch fabric and infrastructure is described. The data center switch fabric may leverage low cost, off-the-shelf packet-based switching components (e.g., IP over Ethernet (IPoE)) and overlay forwarding technologies rather than proprietary switch fabric. In one example, host network accelerators (HNAs) are positioned between servers (e.g., virtual machines or dedicated servers) of the data center and an IPoE core network that provides point-to-point connectivity between the servers. The HNAs are hardware devices that embed virtual routers on one or more integrated circuits, where the virtual router are configured to extend the one or more virtual networks to the virtual machines and to seamlessly transport packets over the switch fabric using an overlay network. In other words, the HNAs provide hardware-based, seamless access interfaces to overlay technologies used for communicating packet flows through the core switching network of the data center.

19 Claims, 13 Drawing Sheets

Related U.S. Application Data continuation of application No. 14/309,682, filed on Jun. 19, 2014, now Pat. No. 9,479,457.

(60) Provisional application No. 61/973,045, filed on Mar. 31, 2014.

(51) Int. Cl.
  *H04L 12/46* (2006.01)
  *H04L 12/863* (2013.01)
  *H04L 12/715* (2013.01)
  *H04L 12/933* (2013.01)

(52) U.S. Cl.
  CPC .......... *H04L 47/6215* (2013.01); *H04L 49/10* (2013.01); *H04L 49/70* (2013.01)

(56) References Cited

U.S. PATENT DOCUMENTS

| | | |
|---|---|---|
| 6,760,328 B1 | 7/2004 | Ofek |
| 6,778,531 B1 | 8/2004 | Kodialam et al. |
| 6,781,959 B1 | 8/2004 | Garakani et al. |
| 6,985,490 B2 | 1/2006 | Czeiger et al. |
| 7,042,838 B1 | 5/2006 | Shand et al. |
| 7,178,059 B2 | 2/2007 | Greenspan et al. |
| 7,184,437 B1 | 2/2007 | Cole et al. |
| 7,215,667 B1 | 5/2007 | Davis |
| 7,500,014 B1 | 3/2009 | Jacobson et al. |
| 7,519,006 B1 | 4/2009 | Wing |
| 7,937,492 B1 | 5/2011 | Kompella et al. |
| 7,941,539 B2 | 5/2011 | Tripathi et al. |
| 7,965,699 B1 | 6/2011 | Accardi et al. |
| 8,018,860 B1 | 9/2011 | Cook |
| 8,018,938 B1 | 9/2011 | Fromm et al. |
| 8,089,905 B2 | 1/2012 | Umeshima |
| 8,254,273 B2 | 8/2012 | Kaminsky et al. |
| 8,291,468 B1 | 10/2012 | Chickering |
| 8,339,959 B1 | 12/2012 | Moisand et al. |
| 8,429,647 B2 | 4/2013 | Zhou et al. |
| 8,503,468 B2 * | 8/2013 | Akyol .................. G06F 13/385 370/389 |
| 8,638,799 B2 | 1/2014 | Mudigonda et al. |
| 8,699,499 B2 | 4/2014 | Mulligan et al. |
| 8,750,288 B2 | 6/2014 | Nakil et al. |
| 8,755,377 B2 | 6/2014 | Nakil et al. |
| 8,767,722 B2 | 7/2014 | Kamble et al. |
| 8,806,025 B2 | 8/2014 | Hummel et al. |
| 8,908,691 B2 * | 12/2014 | Biswas ............... H04L 12/4633 370/392 |
| 8,909,602 B2 | 12/2014 | Soundararajan et al. |
| 8,953,441 B2 | 2/2015 | Nakil et al. |
| 8,953,443 B2 | 2/2015 | Yang et al. |
| 8,958,293 B1 | 2/2015 | Anderson |
| 8,959,185 B2 | 2/2015 | Nakil et al. |
| 9,014,191 B1 | 4/2015 | Mandal et al. |
| 9,042,383 B2 | 5/2015 | Hendel et al. |
| 9,154,416 B2 | 10/2015 | Koganti |
| 9,294,304 B2 | 3/2016 | Sindhu |
| 9,319,335 B1 | 4/2016 | Tripathi |
| 9,356,866 B1 | 5/2016 | Sivaramakrishnan et al. |
| 9,479,457 B2 | 10/2016 | Sindhu |
| 9,485,191 B2 | 11/2016 | Sindhu |
| 9,571,394 B1 | 2/2017 | Sivaramakrishnan et al. |
| 9,948,579 B1 | 4/2018 | Sivaramakrishnan |
| 9,954,798 B2 | 4/2018 | Sindhu |
| 2003/0126233 A1 | 7/2003 | Bryers et al. |
| 2004/0057378 A1 | 3/2004 | Gronberg |
| 2004/0210619 A1 | 10/2004 | Balachandran et al. |
| 2005/0108356 A1 | 5/2005 | Rosu et al. |
| 2005/0163115 A1 | 7/2005 | Dontu et al. |
| 2006/0221961 A1 | 10/2006 | Basso et al. |
| 2007/0025256 A1 | 2/2007 | Hertoghs et al. |
| 2007/0147372 A1 | 6/2007 | Liu et al. |
| 2007/0195787 A1 | 8/2007 | Alnuweiri et al. |
| 2007/0195797 A1 | 8/2007 | Patel et al. |
| 2008/0144625 A1 | 7/2008 | Wu et al. |
| 2008/0240122 A1 | 10/2008 | Richardson et al. |
| 2009/0006710 A1 | 1/2009 | Daniel et al. |
| 2009/0052894 A1 | 2/2009 | Murata |
| 2009/0199177 A1 | 8/2009 | Edwards et al. |
| 2009/0327392 A1 | 12/2009 | Tripathi et al. |
| 2010/0014526 A1 | 1/2010 | Chavan et al. |
| 2010/0057649 A1 | 3/2010 | Lee et al. |
| 2010/0061242 A1 | 3/2010 | Sindhu et al. |
| 2010/0214949 A1 | 8/2010 | Smith et al. |
| 2011/0090911 A1 | 4/2011 | Hao et al. |
| 2011/0103259 A1 | 5/2011 | Aybay et al. |
| 2011/0264610 A1 | 10/2011 | Armstrong et al. |
| 2011/0276963 A1 | 11/2011 | Wu et al. |
| 2011/0299528 A1 | 12/2011 | Yu et al. |
| 2011/0317696 A1 | 12/2011 | Aldrin et al. |
| 2012/0011170 A1 | 1/2012 | Elad et al. |
| 2012/0027018 A1 | 2/2012 | Ilyadis |
| 2012/0051358 A1 | 3/2012 | Bellagamba et al. |
| 2012/0110186 A1 | 5/2012 | Kapur et al. |
| 2012/0110393 A1 | 5/2012 | Shieh et al. |
| 2012/0170578 A1 | 7/2012 | Anumala et al. |
| 2012/0207161 A1 | 8/2012 | Uppalli et al. |
| 2012/0230186 A1 | 9/2012 | Lee et al. |
| 2012/0233668 A1 | 9/2012 | Leafe et al. |
| 2012/0257892 A1 | 10/2012 | Boyd et al. |
| 2012/0320795 A1 | 12/2012 | Shukla et al. |
| 2013/0003725 A1 | 1/2013 | Hendel et al. |
| 2013/0028073 A1 | 1/2013 | Tatipamula et al. |
| 2013/0044641 A1 | 2/2013 | Koponen et al. |
| 2013/0074066 A1 | 3/2013 | Sanzgiri et al. |
| 2013/0100816 A1 | 4/2013 | Bergamasco et al. |
| 2013/0142202 A1 | 6/2013 | Cors et al. |
| 2013/0163606 A1 | 6/2013 | Bagepalli et al. |
| 2013/0215754 A1 | 8/2013 | Tripathi et al. |
| 2013/0215769 A1 | 8/2013 | Beheshti-Zavareh et al. |
| 2013/0232492 A1 | 9/2013 | Wang |
| 2013/0235870 A1 | 9/2013 | Tripathi et al. |
| 2013/0238885 A1 | 9/2013 | Tripathi et al. |
| 2013/0242983 A1 | 9/2013 | Tripathi et al. |
| 2013/0294243 A1 | 11/2013 | Wiley et al. |
| 2013/0315596 A1 | 11/2013 | Rollet |
| 2013/0322237 A1 | 12/2013 | DeCusatis et al. |
| 2013/0329548 A1 | 12/2013 | Nakil et al. |
| 2013/0329571 A1 | 12/2013 | Shimokawa et al. |
| 2013/0329584 A1 | 12/2013 | Ghose et al. |
| 2013/0329605 A1 | 12/2013 | Nakil et al. |
| 2013/0329725 A1 * | 12/2013 | Nakil .................. H04L 45/586 370/360 |
| 2013/0332399 A1 | 12/2013 | Reddy et al. |
| 2013/0332577 A1 | 12/2013 | Nakil et al. |
| 2013/0332601 A1 | 12/2013 | Nakil et al. |
| 2013/0346531 A1 | 12/2013 | Hummel et al. |
| 2013/0346665 A1 | 12/2013 | Freking et al. |
| 2014/0050218 A1 | 2/2014 | Kamble et al. |
| 2014/0056151 A1 | 2/2014 | Petrus et al. |
| 2014/0056298 A1 | 2/2014 | Vobbilisetty et al. |
| 2014/0059537 A1 | 2/2014 | Kamble et al. |
| 2014/0126418 A1 | 5/2014 | Brendel et al. |
| 2014/0129700 A1 | 5/2014 | Mehta et al. |
| 2014/0129753 A1 | 5/2014 | Schuette et al. |
| 2014/0146705 A1 | 5/2014 | Luxenberg et al. |
| 2014/0195666 A1 | 7/2014 | Dumitriu et al. |
| 2014/0229941 A1 | 8/2014 | Bert et al. |
| 2014/0233568 A1 | 8/2014 | Dong |
| 2014/0269321 A1 | 9/2014 | Kamble et al. |
| 2014/0301197 A1 | 10/2014 | Birke et al. |
| 2015/0032910 A1 | 1/2015 | Ben Yehuda et al. |
| 2015/0172201 A1 | 6/2015 | DeCusatis et al. |
| 2015/0244617 A1 | 8/2015 | Nakil et al. |
| 2015/0278148 A1 | 10/2015 | Sindhu |
| 2017/0019351 A1 | 1/2017 | Sindhu |

(56) References Cited

U.S. PATENT DOCUMENTS

| | | | |
|---|---|---|---|
| 2017/0177396 | A1 | 6/2017 | Palermo et al. |
| 2017/0257326 | A1 | 9/2017 | Bogdanski et al. |

FOREIGN PATENT DOCUMENTS

| | | | |
|---|---|---|---|
| CN | 101040471 | A | 9/2007 |
| CN | 101150499 | A1 | 3/2008 |
| CN | 101658001 | A | 2/2010 |
| CN | 102281148 | A | 12/2011 |
| CN | 102821038 | A | 12/2012 |
| CN | 102857494 | A | 1/2013 |
| EP | 0298136 | A1 | 1/1989 |
| EP | 1482689 | A2 | 12/2004 |
| EP | 1549002 | A1 | 6/2005 |
| WO | 2008088402 | A1 | 7/2008 |
| WO | 2013184846 | A1 | 12/2013 |

OTHER PUBLICATIONS

"Amazon CloudWatch Developer Guide API Version Aug. 1, 2010," Amazon Web Services LLC, 2011, 84 pp. (Note: Applicant points out in accordance with MPEP 609.04(a) that the 2011 year of publication is sufficiently earlier than the effective U.S. filing date and any foreign priority date of Jun. 19, 2014 so that the particular month of publication is not in issue.)

"Cloud Computing and Security—A Natural Match," Trusted Computing Group, Apr. 2010, 5 pp.

"I/O Virtualization," Wikipedia, the free encyclopedia, accessed on Dec. 20, 2016, from https://en.wikipedia.org/wiki/I/O_virtualization, 3 pp.

"Network Interface Controller Drivers—11. I40E/IXGBE/IGB Virtual Function Driver," Data Plane Development Kit, accessed on Dec. 20, 2016, from http://dpdk.org/doc/guides-16.07/nics/intel_vf.html, 15 pp.

"PCI Express—An Overview of the PCI Express Standard," National Instruments, Aug. 13, 2009, 6 pp.

"PCI Express," Wikipedia, the free encyclopedia, accessed on Dec. 20, 2016, from https://en.wikipedia.org/wiki/PCI_Express, 21 pp.

"PCI-SIG SR-IOV Primer: An Introduction to SR-IOV Technology—Revision 2.5," Intel Corp., LAN Access Division, Jan. 2011, 28 pp.

"TCG Trusted Network Connect, TNC IF-MAP Binding for SOAP," TCG Published, Specification version 2.1, Revision 15, May 7, 2012, 81 pp.

"TNC IF-MAP Binding for SOAP," TCG Trusted Network Connect, Specification version 2.1, Revision 15, May 7, 2012, 81 pp.

"Trusted Multi-Tenant Infrastructure Work Group FAQ," Trusted Computing Group, Sep. 2010, 2 pp.

David, "An overview of direct memory access," The Infinite Loop—Tales from a lean programmer, Apr. 27, 2014, accessed from https://geidav.wordpress.com/2014/04/27/an-overview-of-direct-memory-access/, 6 pp.

Extended Search Report from counterpart European Application No. 15160100.2, dated Dec. 18, 2015, 13 pp.

Handigol et al., "Aster*x: Load-Balancing Web Traffic over Wide-Area Networks," 9th GENI Engineering Conference (GEC9), Nov. 2, 2010, 4 pp.

Hopps, "Analysis of an Equal-Cost Multi-Path Algorithm," Network Working Group, RFC 2992, Nov. 2000, 8 pp.

Kim et al, "Internet Protocol Engine in TCP/IP Offloading Engine," 10th International Conference on Advanced Communication Technology, Feb. 17-20, 2008, 6 pp.

Marques et al., "BGP-signaled end-system IP/VPNs," drafl-ietf-I3vpn-end-system-00, Network Working Group, Internet-Draft, Oct. 2012, 21 pp.

Partial Search Report from counterpart European Application No. 15160100.2, dated Jul. 27, 2015, 6 pp.

Response to Extended Search Report dated Dec. 18, 2015, from counterpart European Application No. 15160100.2, filed Jul. 13, 2016, 7 pp.

U.S. Appl. No. 15/447,021, by Juniper Networks (Inventors: Babu et al.), filed Mar. 1, 2017.

Zhu et al., "Tunnel Congestion Exposure," Internet Draft: draft-zheng-tsvwg-tunnel-congestion-exposure-00, Oct. 15, 2012, 16 pp.

Prosecution History from U.S. Appl. No. 14/309,682, dated Mar. 23, 2016 through Sep. 8, 2016, 57 pp.

Prosecution History from U.S. Appl. No. 15/281,021, dated Aug. 14, 2017 through Jan. 18, 2018, 51 pp.

Prosecution History from U.S. Appl. No. 14/309,629, dated Oct. 2, 2014, through Feb. 18, 2016, 118 pp.

Prosecution History from U.S. Appl. No. 14/309,714, dated Jul. 13, 2016 through Mar. 13, 2017, 79 pp.

Prosecution History from U.S. Appl. No. 14/309,736, dated Jan. 26, 2016 through Aug. 17, 2016, 38 pp.

Aggarwal et al., "BGP MPLS Based Ethernet VPN, draft-raggarwa-sajassi-I2vpn-evpn-02.txt," Internet Draft, Network Working Group, Mar. 14, 2011, 42 pp.

"FCOE Convergence at the Access Layer with Juniper Networks QFX3500 Switch," White Paper, Juniper Networks, Inc., Jul. 2011, 14 pp.

"PCI Express Base Specification Revision 3.0," PCI Express, PCI Special Interest Group (PCI-SIG), Nov. 10, 2012, 860 pp.

"The QFabric Architecture—Implementing a Flat Data Center Network," White Paper, Juniper Networks, Inc., Feb. 2013, 26 pp.

Translation of the Notification of the First Office Action from counterpart Chinese Application No. 201410751068.3, filed Mar. 1, 2019, 3 pp.

\* cited by examiner

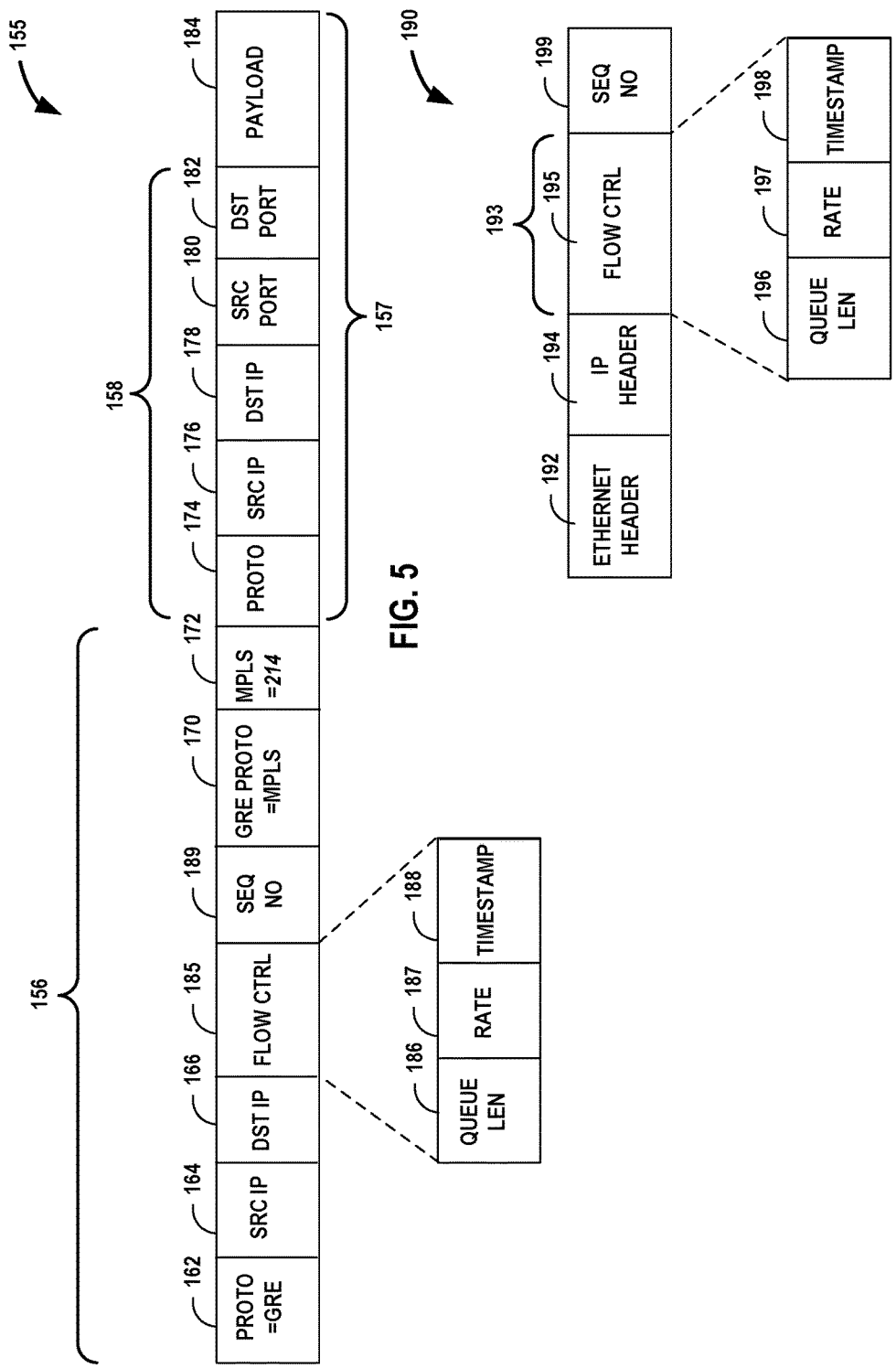

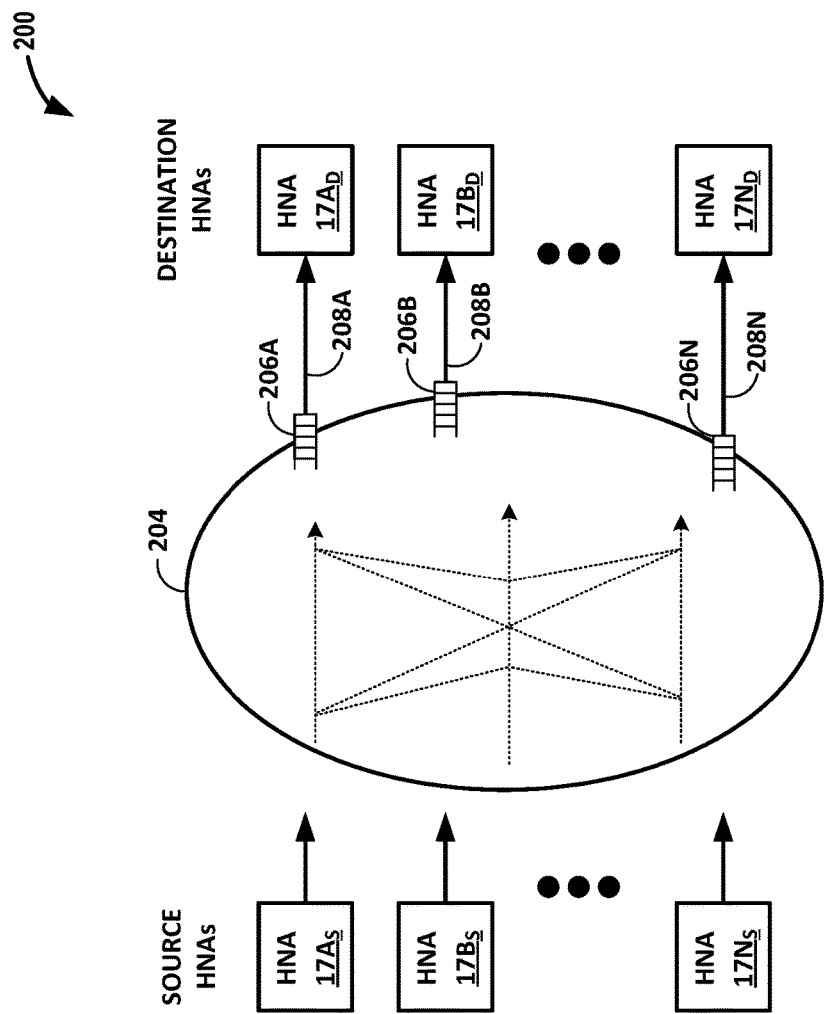

NETWORK SERVER HAVING HARDWARE-BASED VIRTUAL ROUTER INTEGRATED CIRCUIT FOR VIRTUAL NETWORKING

This application is a continuation of U.S. application Ser. No. 15/281,021, filed, Sep. 29, 2016, which is a continuation of U.S. application Ser. No. 14/309,682, filed Jun. 19, 2014, now U.S. Pat. No. 9,479,457, issued Oct. 25, 2016, which claims the benefit of U.S. Provisional Application No. 61/973,045, filed Mar. 31, 2014, the entire contents of each application hereby incorporated herein by reference.

TECHNICAL FIELD

The invention relates to computer networks and, more particularly, to data centers that provide virtual networks.

BACKGROUND

In a typical cloud-based data center, a large collection of interconnected servers provides computing and/or storage capacity for execution of various applications. For example, a data center may comprise a facility that hosts applications and services for subscribers, i.e., customers of data center. The data center may, for example, host all of the infrastructure equipment, such as networking and storage systems, redundant power supplies, and environmental controls. In most data centers, clusters of storage systems and application servers are interconnected via high-speed switch fabric provided by one or more tiers of physical network switches and routers. More sophisticated data centers provide infrastructure spread throughout the world with subscriber support equipment located in various physical hosting facilities.

Data centers tend to utilize either propriety switch fabric with proprietary communication techniques or off-the-shelf switching components that switch packets conforming to conventional packet-based communication protocols. Proprietary switch fabric can provide high performance, but can sometimes be more costly and, in some cases, may provide a single point of failure for the network. Off-the-shelf packet-based switching components may be less expensive, but can result in lossy, non-deterministic behavior.

SUMMARY

In general, this disclosure describes a high-performance, scalable and drop-free data center switch fabric and infrastructure. The data center switch fabric may leverage low cost, off-the-shelf packet-based switching components (e.g., IP over Ethernet (IPoE)) and overlay forwarding technologies rather than proprietary switch fabric.

In one example, host network accelerators (HNAs) are positioned between servers (e.g., virtual machines or dedicated servers) of the data center and an IPoE core network that provides point-to-point connectivity between the servers. The HNAs are hardware devices that embed virtual routers on one or more integrated circuits, where the virtual router are configured to extend the one or more virtual networks to the virtual machines and to seamlessly transport packets over the switch fabric using an overlay network. In other words, the HNAs provide hardware-based, seamless access interfaces to overlay technologies used for communicating packet flows through the core switching network of the data center.

Moreover, the HNAs incorporate and implement flow control, scheduling, and Quality of Service (QoS) features in the integrated circuits so as to provide a high-performance, scalable and drop-free data center switch fabric based on non-proprietary packet-based switching protocols (e.g., IP over Ethernet) and overlay forwarding technologies, that is, without requiring a proprietary switch fabric.

As such, the techniques described herein may provide for a multipoint-to-multipoint, drop-free, and scalable physical network extended to virtual routers of HNAs operating at the edges of an underlying physical network of a data center. As a result, servers or virtual machines hosting user applications for various tenants experience high-speed and reliable layer 3 forwarding while leveraging low cost, industry-standard forwarding technologies without requiring proprietary switch fabric.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 5 is a block diagram illustrating, in detail, an example tunnel packet that may be processed by a computing device according to techniques described in this disclosure.

FIG. 6 is a block diagram illustrating, in detail, an example packet structure that may be used host network accelerators for maintaining pairwise "heart beat" messages for exchanging updated flow control information in the event tunnel packets are not currently being exchanged through the overlay network for a given source/destination HNA pair.

FIG. 7 is a block diagram illustrating a conceptual diagram of host network accelerators (HNAs) interconnected by a switch fabric in a mesh topology for scalable, drop-free, end-to-end communications between HNAs in accordance with techniques described herein.

Like reference characters denote like elements throughout the figures and text.

DETAILED DESCRIPTION

Figure 1:
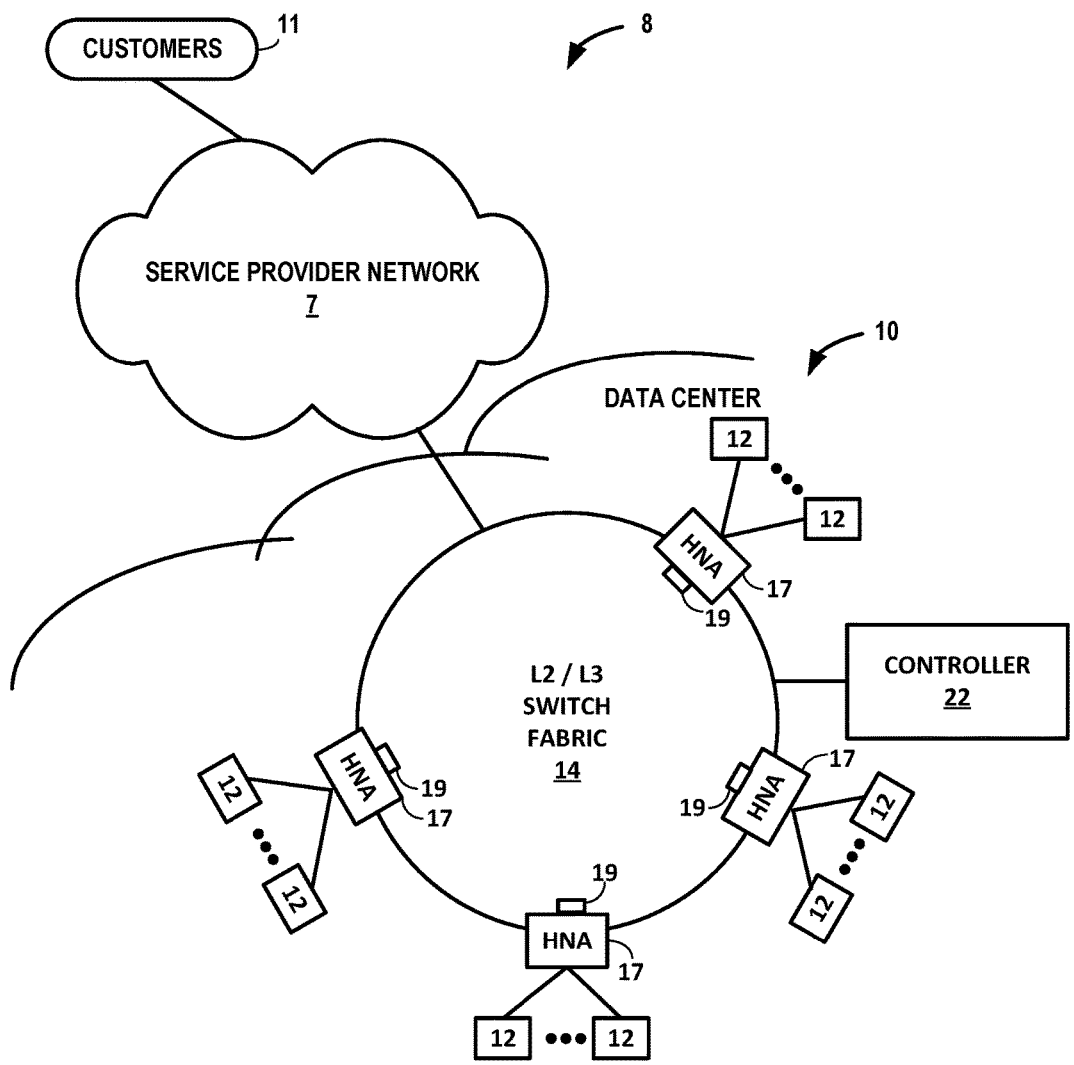
FIG. 1 is a block diagram illustrating an example network having a data center in which examples of the techniques described herein may be implemented.

FIG. 1 is a block diagram illustrating an example network 8 having a data center 10 in which examples of the techniques described herein may be implemented. In general, data center 10 provides an operating environment for applications and services for customers 11 coupled to the data center by service provider network 7. Data center 10 may, for example, host infrastructure equipment, such as networking and storage systems, redundant power supplies, and environmental controls. Service provider network 7 may be coupled to one or more networks administered by other providers, and may thus form part of a large-scale public network infrastructure, e.g., the Internet.

In some examples, data center 10 may represent one of many geographically distributed network data centers. As illustrated in the example of FIG. 1, data center 10 may be a facility that provides network services for customers 11. Customers 11 may be collective entities such as enterprises and governments or individuals. For example, a network data center may host web services for several enterprises and end users. Other exemplary services may include data storage, virtual private networks, traffic engineering, file service, data mining, scientific- or super-computing, and so on. In some embodiments, data center 10 may be individual network servers, network peers, or otherwise.

In this example, data center 10 includes a set of storage systems and application servers 12A-12X (herein, "servers 12") interconnected via high-speed switch fabric 14 provided by one or more tiers of physical network switches and routers. Servers 12 provide execution and storage environments for applications and data associated with customers 11 and may be physical servers, virtual machines or combinations thereof.

In general, switch fabric 14 represents layer two (L2) and layer three (L3) switching and routing components that provide point-to-point connectivity between servers 12. In one example, switch fabric 14 comprises a set of interconnected, high-performance yet off-the-shelf packet-based routers and switches that implement industry standard protocols. In one example, switch fabric 14 may comprise off-the-shelf components that provide Internet Protocol (IP) over an Ethernet (IPoE) point-to-point connectivity.

In FIG. 1, software-defined networking (SDN) controller 22 provides a high-level controller for configuring and managing routing and switching infrastructure of data center 10. SDN controller 22 provides a logically and in some cases physically centralized controller for facilitating operation of one or more virtual networks within data center 10 in accordance with one or more embodiments of this disclosure. In some examples, SDN controller 22 may operate in response to configuration input received from network administrator 24. Additional information regarding virtual network controller 22 operating in conjunction with other devices of data center 10 or other software-defined network is found in International Application Number PCT/US2013/044378, filed Jun. 5, 2013, and entitled PHYSICAL PATH DETERMINATION FOR VIRTUAL NETWORK PACKET FLOWS, which is incorporated by reference as if fully set forth herein.

Although not shown, data center 10 may also include, for example, one or more non-edge switches, routers, hubs, gateways, security devices such as firewalls, intrusion detection, and/or intrusion prevention devices, servers, computer terminals, laptops, printers, databases, wireless mobile devices such as cellular phones or personal digital assistants, wireless access points, bridges, cable modems, application accelerators, or other network devices.

In general, network traffic within switch fabric 14, such as packet flows between servers 12, can traverse the physical network of the switch fabric using many different physical paths. For example, a "packet flow" can be defined by the five values used in a header of a packet, or "five-tuple," i.e., a source IP address, destination IP address, source port and destination port that are used to route packets through the physical network and a communication protocol. For example, the protocol specifies the communications protocol, such as TCP or UDP, and Source port and Destination port refer to source and destination ports of the connection. A set of one or more packet data units (PDUs) that match a particular flow entry represent a flow. Flows may be broadly classified using any parameter of a PDU, such as source and destination data link (e.g., MAC) and network (e.g., IP) addresses, a Virtual Local Area Network (VLAN) tag, transport layer information, a Multiprotocol Label Switching (MPLS) or Generalized MPLS (GMPLS) label, and an ingress port of a network device receiving the flow. For example, a flow may be all PDUs transmitted in a Transmission Control Protocol (TCP) connection, all PDUs sourced by a particular MAC address or IP address, all PDUs having the same VLAN tag, or all PDUs received at the same switch port.

In accordance with various aspects of the techniques described in this disclosure, data center 10 includes host network accelerators (HNAs) positioned between servers 12 and switch fabric 14. As shown in FIG. 1, each HNA may be positioned between one or more servers 12 and switch fabric 14 that provides infrastructure for transporting packet flows between servers 12. As further described herein, HNAs 17 provide a hardware-based acceleration for seamlessly implementing an overlay network across switch fabric 14. That is, HNAs 17 implement functionality for implementing an overlay network for establishing and supporting of virtual networks within data center 10.

As further described, each HNA 17 implements a virtual router that executes multiple routing instances for corresponding virtual networks within data center 10. Packets sourced by servers 12 and conforming to the virtual networks are received by HNAs 17 and automatically encapsulated to form tunnel packets for traversing switch fabric 14. Each tunnel packet may each include an outer header and a payload containing an inner packet. The outer headers of the tunnel packets allow the physical network components of switch fabric 14 to "tunnel" the inner packets to physical network addresses for network interfaces 19 of HNAs 17. The outer header may include not only the physical network address of the network interface 19 of the server 12 to which the tunnel packet is destined, but also a virtual network identifier, such as a VxLAN tag or Multiprotocol Label Switching (MPLS) label, that identifies one of the virtual networks as well as the corresponding routing instance executed by the virtual router. An inner packet includes an inner header having a destination network address that conform to the virtual network addressing space for the virtual network identified by the virtual network identifier. As such, HNAs 17 provide hardware-based, seamless access interfaces for overlay technologies for tunneling packet flows through the core switching network 14 of data center 10 in a way that is transparent to servers 12.

As described herein, HNAs 17 integrate a number of mechanisms, such as flow control, scheduling & quality of service (QoS), with the virtual routing operations for seamlessly proving overlay networking across switch fabric 14. In this way, HNAs 17 are able to provide a high-performance, scalable and drop-free data interconnect that leverages low cost, industry-standard forwarding technologies without requiring proprietary switch fabric.

Figure 2A:
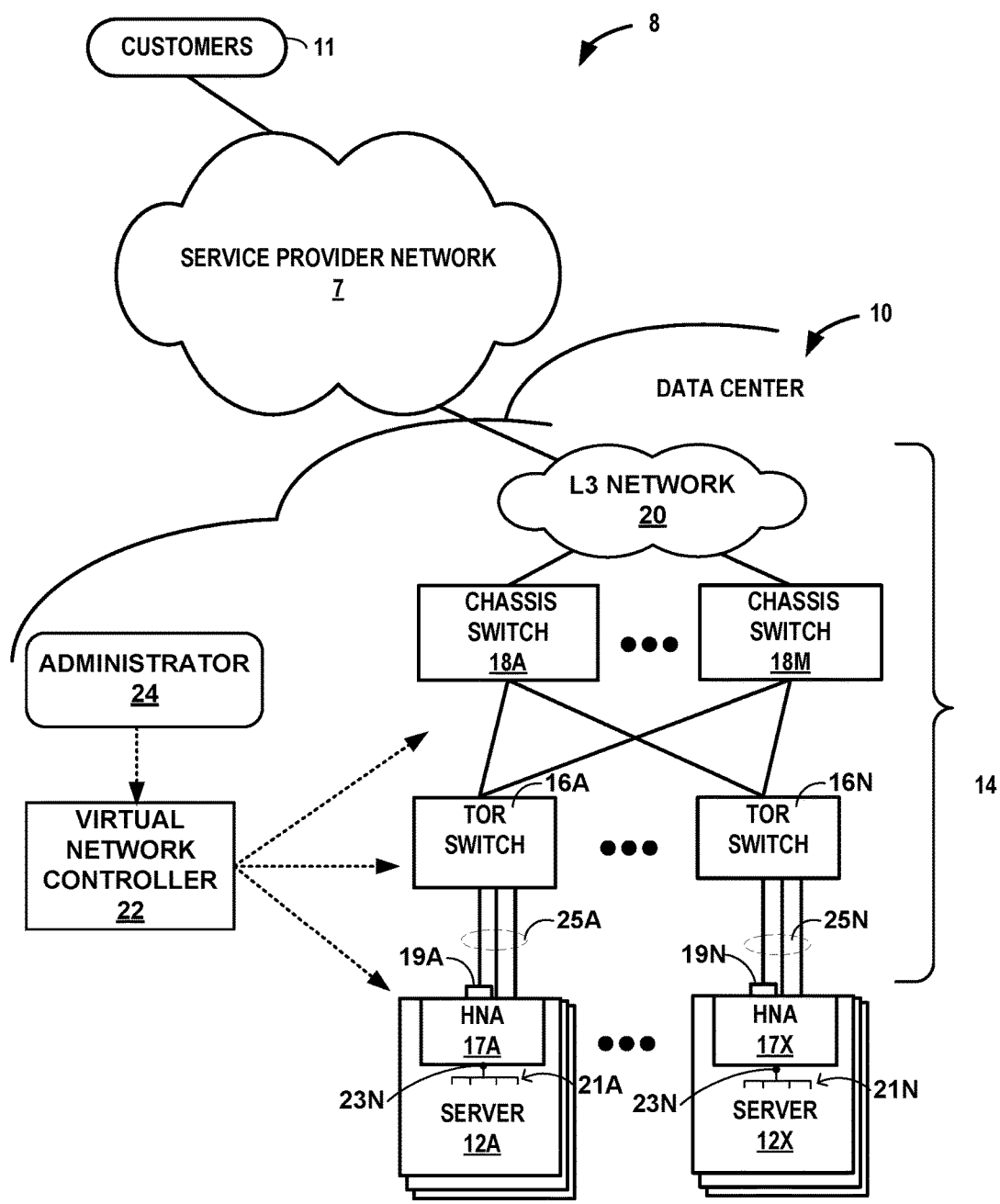
FIG. 2A is a block diagram illustrating an example implementation in which host network accelerators are deployed within servers of the data center.

FIG. 2A is a block diagram illustrating an example implementation in which host network accelerators (HNAs) 17 are deployed within servers 12 of data center 10. In this simplified example, switch fabric 14 is provided by a set of interconnected top-of-rack (TOR) switches 16A-16BN (collectively, "TOR switches 16") coupled to a distribution layer of chassis switches 18A-18M (collectively, "chassis switches 18"). TOR switches 16 and chassis switches 18 provide servers 12 with redundant (multi-homed) connectivity. TOR switches 16 may be network devices that provide layer 2 (MAC) and/or layer 3 (e.g., IP) routing and/or switching functionality. Chassis switches 18 aggregate traffic flows and provide high-speed connectivity between TOR switches 16. Chassis switches 18 are coupled to IP layer three (L3) network 20, which performs L3 routing to route network traffic between data center 10 and customers 11 by service provider network 7.

In this example implementation, HNAs 17 are deployed as specialized cards within chassis of servers 12. In one example, HNAs 17 include core-facing network interfaces 19 for communicating with TOR switches 16 by, for example, Ethernet or other physical network links 25A-25N. In addition, HNAs 17 include high-speed peripheral interfaces 23A-23N so as to be operable directly on input/output (I/O) busses 21 of servers 12. HNAs 17 may, for example, appear as network interfaces cards (NICs) to servers 12 and, therefore, provide robust tunneling of packet flow as described herein in a manner that may be transparent to the servers 12. In one example, high-speed peripheral interfaces 23 comprise peripheral component interconnect express (PCIe) interfaces for insertion as expansion cards within respective chassis of servers 12 and coupling directly to PCIe busses 21 of servers 12.

Figure 2B:
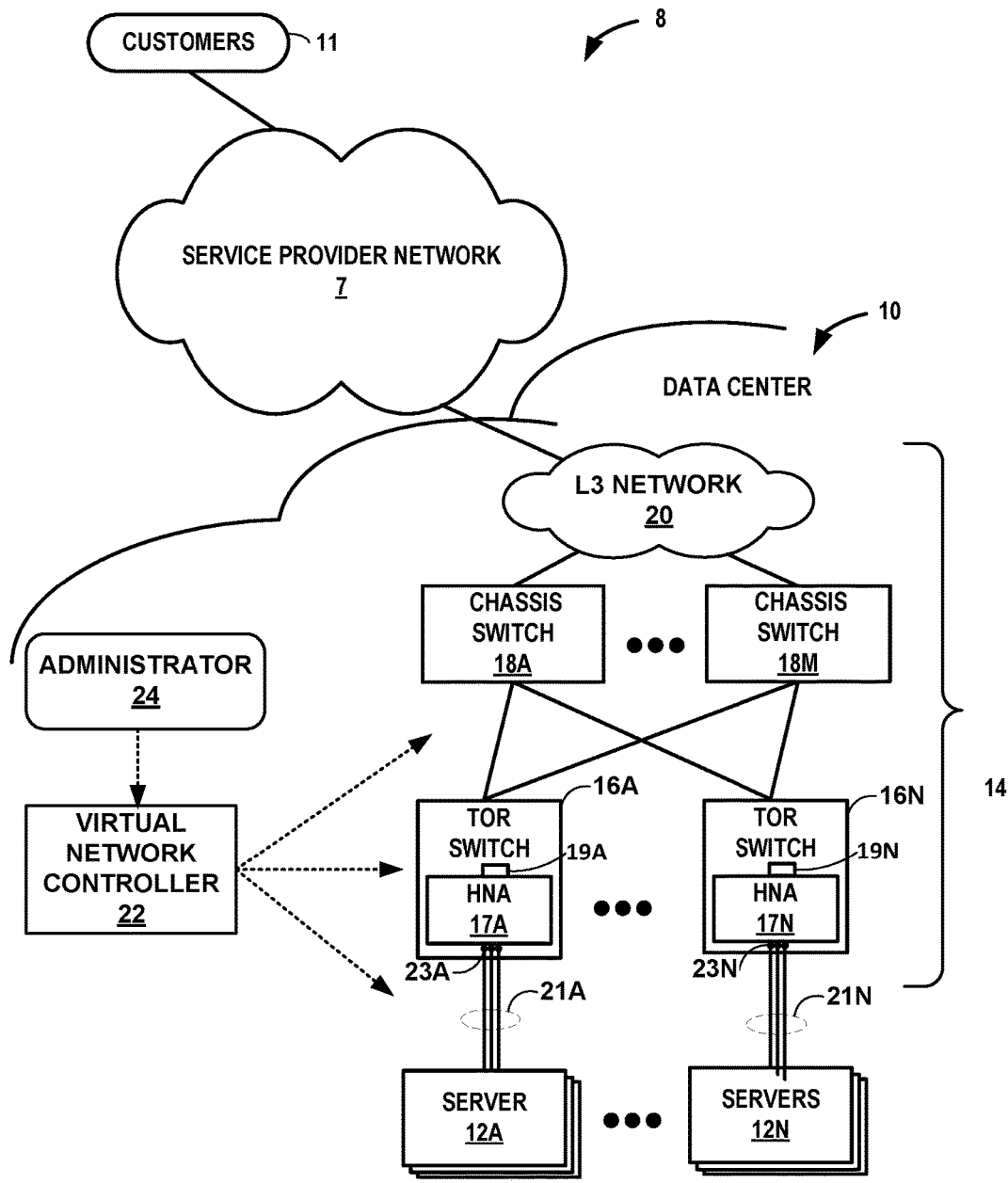
FIG. 2B is a block diagram illustrating an example implementation in which host network accelerators are deployed within top-of-rack switches (TORs) of the data center.

FIG. 2B is a block diagram illustrating an example implementation in which host network accelerators (HNAs) 17 are deployed within top-of-rack switches (TORs) of data center 10. As in the example of FIG. 2A, switch fabric 14 is provided by a set of interconnected TOR switches 16 coupled to a distribution layer of chassis switches 18. In this example, however, HNAs 17 are integrated within TOR switches 16 and similarly provide robust tunneling of packet flows between servers 12 in a manner that is transparent to the servers 12.

In this example, each of HNAs 17 provide a core-facing network interface 19 for communicating packets across switch fabric 14 of data center 10. In addition, HNAs 21 may provide a high-speed PCIe interface 23 for communication with servers 12 as extensions to PCIe busses 21. Alternatively, HNAs 17 may communicate with network interfaces cards (NICs) of servers 12 via Ethernet or other network links. Although shown separately, the examples of FIGS. 2A and 2B may be used in various combinations such that HNAs 17 may be integrated within servers 12, TORs 16, other devices within data center 10, or combinations thereof.

Figure 3A:
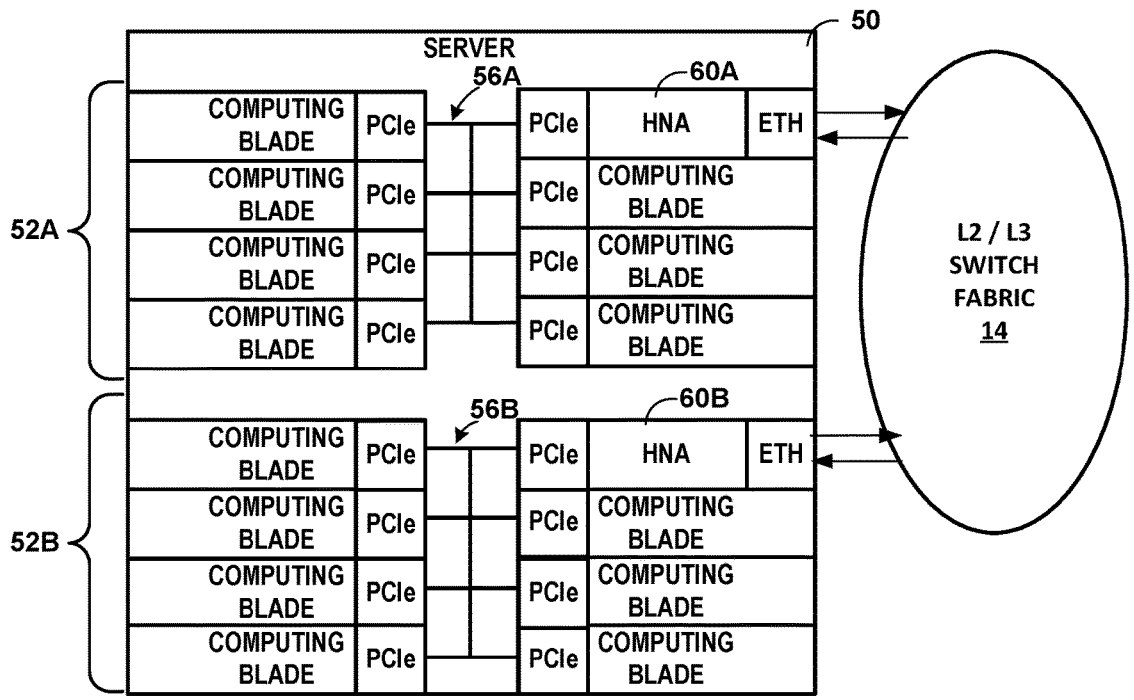
FIG. 3A is a block diagram illustrating in further detail an example implementation of a server having one or more peripheral component interconnect express (PCIe)-based host network accelerators.

FIG. 3A is a block diagram illustrating in further detail an example implementation of a server 50 having one or more PCIe-based host network accelerators 60A, 60B. In this example, server 50 includes two sets of computing blades 52A, 52B (collectively, "computing blades 52) interconnected by respective PCIe busses 56A, 56B.

Computing blades 52 may each provide a computing environment for execution of applications and services. For example, each of computing blades 52 may comprise a computing platform having one or more processor, memory, disk storage and other components that provide an operating environment for an operating system and, in some case, a hypervisor providing a virtual environment for one or more virtual machines.

In this example, each of computing blades 52 comprises PCIe interfaces for coupling to one of PCIe busses 56. Moreover, each of computing blades 52 may be a removable card insertable within a slot of a chassis of server 50.

Each of HNAs 60 similarly includes PCIe interfaces for coupling to one of PCIe busses 56. As such, memory and resources within HNAs 60 are addressable via read and write requests from computing blades 52 via the PCIe packet-based protocol. In this way, applications executing on computing blades 52, including applications executing on virtual machines provided by computing blades 52, may transmit and receive data to respective HNAs 60A, 60B at a high rate over a direct I/O interconnect provided by PCIe busses 56.

HNAs 60 include core-facing network interfaces for communicating L2/L3 packet based networks, such as switch fabric 14 of data center 10. As such, computing blades 52 may interact with HNAs 60 as if the HNAs were PCIe-based network interface cards. Moreover, HNAs 60 implement functionality for implementing an overlay network for establishing and supporting of virtual networks within data center 10, and provide additional functions for ensuring robust, drop-free communications through the L2/L3 network.

Figure 3B:
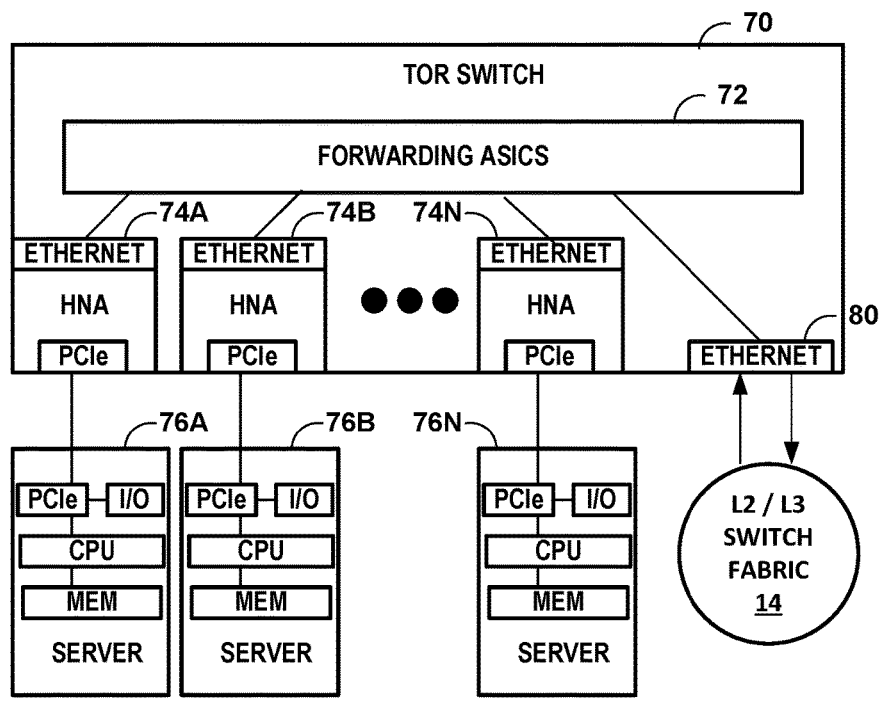
FIG. 3B is a block diagram illustrating in further detail an example implementation of a TOR having one or more PCIe-based host network accelerators.

FIG. 3B is a block diagram illustrating in further detail an example implementation of a TOR switch 70 having one or more PCIe-based host network accelerators 74A-74N (collectively, "HNAs 74"). In this example, TOR switch 70 includes a plurality of HNAs 74 integrated within the TOR switch. HNAs 74 are interconnected by high-speed forwarding ASICs 72 for switching packets between network interfaces of the HNAs and L2/L3 network 14 via core-facing Ethernet port 80.

As shown, each of servers 76A-76N is coupled to TOR switch 70 by way of PCIe interfaces. As such, memory and resources within HNAs 74 are addressable via read and write requests from servers 76 via the PCIe packet-based protocol. In this way, applications executing on computing blades 52, including applications executing on virtual machines provided by computing blades 52, may transmit and receive data to respective HNAs 74 at a high rate over a direct I/O interconnect provided by PCIe busses. Each of servers 76 may be standalone computing devices or may be separate rack-mounted servers within a rack of servers.

Figure 4:
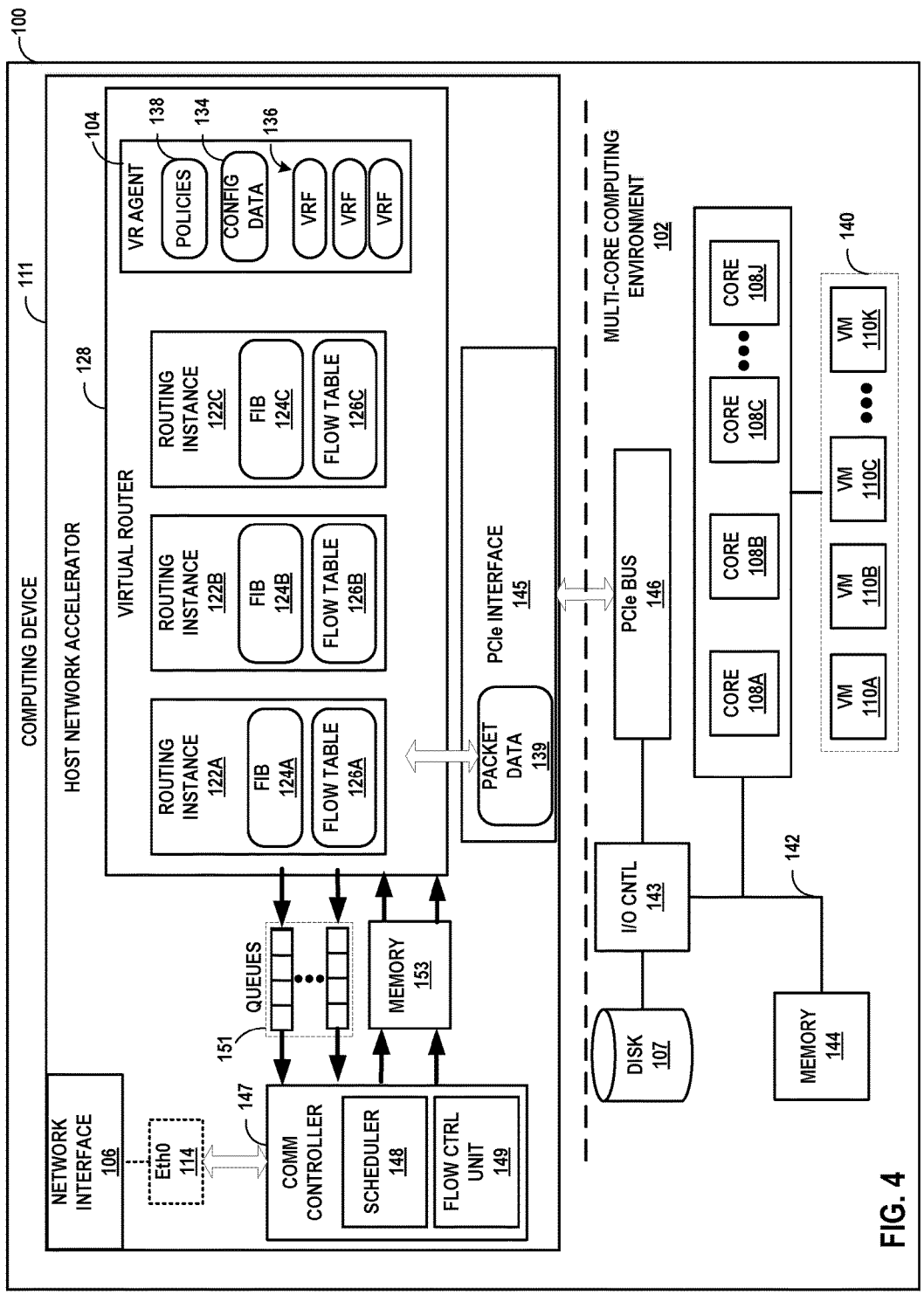
FIG. 4 is a block diagram illustrating further details of a computing device having a PCIe-based host network accelerator.

FIG. 4 is a block diagram illustrating example details of a computing device 100 having a PCIe-based host network accelerator (HNA) 111. Computing device 100 may, for example, represent one of a server (e.g., servers 12 of FIG. 2A or server 50 of FIG. 3A) or a TOR switch (e.g., TOR switches 16 of FIG. 2B or TOR switch 70 of FIG. 3B) integrating a PCIe-based HNA 111.

In this example, computing device 100 includes a system bus 142 coupling hardware components of a computing device 100 hardware environment. System bus 142 couples multi-core computing environment 102 having a plurality of processing cores 108A-108J (collectively, "processing cores 108") to memory 144 and input/output (I/O) controller 143. I/O controller 143 provides access to storage disk 107 and HNA 111 via PCIe bus 146.

Multi-core computing environment 102 may include any number of processors and any number of hardware cores from, for example, four to thousands. Each of processing cores 108 each includes an independent execution unit to perform instructions that conform to an instruction set architecture for the core. Processing cores 108 may each be implemented as separate integrated circuits (ICs) or may be combined within one or more multi-core processors (or "many-core" processors) that are each implemented using a single IC (i.e., a chip multiprocessor).

Disk 107 represents computer readable storage media that includes volatile and/or non-volatile, removable and/or non-removable media implemented in any method or technology for storage of information such as processor-readable instructions, data structures, program modules, or other data. Computer readable storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by cores 108.

Main memory 144 includes one or more computer-readable storage media, which may include random-access memory (RAM) such as various forms of dynamic RAM (DRAM), e.g., DDR2/DDR3 SDRAM, or static RAM (SRAM), flash memory, or any other form of fixed or removable storage medium that can be used to carry or store desired program code and program data in the form of instructions or data structures and that can be accessed by a computer. Main memory 144 provides a physical address space composed of addressable memory locations.

Memory 144 may in some examples present a non-uniform memory access (NUMA) architecture to multi-core computing environment 102. That is, cores 108 may not have equal memory access time to the various storage media that constitute memory 144. Cores 108 may be configured in some instances to use the portions of memory 144 that offer the lowest memory latency for the cores to reduce overall memory latency.

In some instances, a physical address space for a computer-readable storage medium may be shared among one or more cores 108 (i.e., a shared memory). For example, cores 108A, 108B may be connected via a memory bus (not shown) to one or more DRAM packages, modules, and/or chips (also not shown) that present a physical address space accessible by cores 108A, 108B. While this physical address space may offer the lowest memory access time to cores 108A, 108B of any of portions of memory 144, at least some of the remaining portions of memory 144 may be directly accessible to cores 108A, 108B. One or more of cores 108 may also include an L1/L2/L3 cache or a combination thereof. The respective caches for cores 108 offer the lowest-latency memory access of any of storage media for the cores 108.

Memory 144, network interface cards (NICs) 106A-106B (collectively, "NICs 106"), storage disk 107, and multi-core computing environment 102 provide an operating environment for one or more virtual machines 110A-110K (collectively, "virtual machines 110"). Virtual machines 110 may represent example instances of any of virtual machines 36 of FIG. 2. Computing device 100 may partitions the virtual and/or physical address space provided by main memory 144 and, in the case of virtual memory, by disk 107 into user space, allocated for running user processes, and kernel space, which is protected and generally inaccessible by user processes. An operating system kernel (not shown in FIG. 4) may execute in kernel space and may include, for example, a Linux, Berkeley Software Distribution (BSD), another Unix-variant kernel, or a Windows server operating system kernel, available from Microsoft Corp. Computing device 100 may in some instances execute a hypervisor to manage virtual machines 110 (also not shown in FIG. 3). Example hypervisors include Kernel-based Virtual Machine (KVM) for the Linux kernel, Xen, ESXi available from VMware, Windows Hyper-V available from Microsoft, and other open-source and proprietary hypervisors.

As shown in FIG. 4, HNA 111 includes PCIe interface 145 that connects to PCIe bus 146 of computing device 100 as any other PCIe-based device. PCIe interface 145 may provide a physical layer, data link layer and a transaction layer for supporting PCIe-based communications with any of cores 108 and virtual machines 110 executing thereon. As such, PCIe interface 145 is responsive to read/write requests from virtual machines 110 for sending and/or receiving packet data 139 in accordance with the PCIe protocol. As one example, PCIe interface conforms to PCI Express Base 3.0 Specification, PCI Special Interest Group (PCI-SIG), November 2012, the entire content of which is incorporated herein by reference.

Virtual router 128 includes multiple routing instances 122A-122C (collectively, "routing instances 122") for corresponding virtual networks. In general, virtual router executing on HNA 111 is configurable by virtual network controller 22 and provides functionality for tunneling packets over physical L2/L3 switch fabric 10 via an overlay network. In this way, HNA 111 provides a PCIe-based component that may be inserted into computing device 100 as a self-contained, removable host network accelerator that seamlessly support forwarding of packets associated with multiple virtual networks through data center 10 using overlay networking technologies without requiring any other modification of that computing device 100 or installation of software thereon. Outbound packets sourced by virtual machines 110 and conforming to the virtual networks are received by virtual router 128 via PCIe interface 144 and automatically encapsulated to form outbound tunnel packets for traversing switch fabric 14. Each tunnel packet may each include an outer header and a payload containing the original packet. With respect to FIG. 1, the outer headers of the tunnel packets allow the physical network components of switch fabric 14 to "tunnel" the inner packets to physical network addresses of other HNAs 17. As such, virtual router 128 of HNA 111 provides hardware-based, seamless access interfaces for overlay technologies for tunneling packet flows through the core switching network 14 of data center 10 in a way that is transparent to servers 12.

Each of routing instances 122 includes a corresponding one of forwarding information bases (FIBs) 124A-124C (collectively, "FIBs 124") and flow tables 126A-126C (collectively, "flow tables 126"). Although illustrated as separate data structures, flow tables 126 may in some instances be logical tables implemented as a single table or other associative data structure in which entries for respective flow tables 126 are identifiable by the virtual network identifier (e.g., a VRF identifier such as VxLAN tag or MPLS label)). FIBS 124 include lookup tables that map destination addresses to destination next hops. The destination addresses may include layer 3 network prefixes or layer 2 MAC addresses. Flow tables 126 enable application of forwarding policies to flows. Each of flow tables 126 includes flow table entries that each match one or more flows that may traverse virtual router forwarding plane 128 and include a forwarding policy for application to matching flows. For example, virtual router 128 attempts to match packets processed by routing instance 122A to one of the flow table entries of flow table 126A. If a matching flow table entry exists for a given packet, virtual router 128 applies the flow actions specified in a policy to the packet. This may be referred to as "fast-path" packet processing. If a matching flow table entry does not exist for the packet, the packet may represent an initial packet for a new packet flow and virtual router forwarding plane 128 may request virtual router agent 104 to install a flow table entry in the flow table for the new packet flow. This may be referred to as "slow-path" packet processing for initial packets of packet flows.

In this example, virtual router agent 104 may be a process executed by a processor of HNA 111 or may be embedded within firmware or discrete hardware of HNA 111. Virtual router agent 104 includes configuration data 134, virtual routing and forwarding instances configurations 136 ("VRFs 136"), and policy table 138 ("policies 138").

In some cases, virtual router agent 104 communicates with a centralized controller (e.g., controller 22 for data center 10 as shown in FIG. 1) to exchange control information for virtual networks to be supported by HNA 111. Control information may include, virtual network routes, low-level configuration state such as routing instances and forwarding policy for installation to configuration data 134, VRFs 136, and policies 138. Virtual router agent 104 may also report analytics state, install forwarding state to FIBS 124 of virtual router 128, discover VMs 110 and attributes thereof. As noted above, virtual router agent 104 further applies slow-path packet processing for the first (initial) packet of each new flow traversing virtual router forwarding plane 128 and installs corresponding flow entries to flow tables 126 for the new flows for fast path processing by virtual router forwarding plane 128 for subsequent packets of the flows.

As shown in FIG. 4, HNA 111 includes an embedded communications controller 147 positioned between virtual router 128 and network interface 106 for exchanging packets using links of an underlying physical network, such as L2/L3 switch fabric 14 (FIG. 1). As described herein, communication controller 147 provides mechanisms that allow overlay forwarding functionality provided by virtual router 104 to be utilized with off-the-shelf, packet-based L2/L3 networking components yet provide a high-performance, scalable and drop-free data center switch fabric based on IP over Ethernet & overlay forwarding technologies without requiring proprietary switch fabric.

In this example, communications controller 147 embedded within HNA includes scheduler 148 and flow control unit 149. As described herein, scheduler 148 manages one or more outbound queues 151 for pairwise, point-to-point communications with each HNA reachable via network interface 106. For example, with respect to FIG. 1, scheduler 148 manages one or more outbound queues 151 for point-to-point communications with other HNAs 17 within data center 10 and reachable via L2/L3 switch fabric 14. In one example, scheduler 148 maintains eight (8) outbound queues 151 for supporting eight (8) concurrent communication streams for each HNA 12 discovered or otherwise identified within data center 10. Each of outbound queues 151 for communicating with a respective HNA with data center 10 may be associated with a different priority level. Scheduler 148 schedules communication to each HNA as a function of the priorities for any outbound communications from virtual router 128, the available bandwidth of network interface 106, an indication of available bandwidth and resources at the destination HNAs as reported by flow control unit 149.

In general, flow control unit 149 communicates with flow control units of other HNAs within the network, such as other HNAs 17 within data center 10, to provide congestion control for tunnel communications using the overlay network established by virtual router 128. As described herein, flow control units 149 of each source/destination pair of HNAs utilize flow control information to provide robust, drop-free communications through L2/L3 switch fabric 14.

For example, as further described below, each source/destination pair of HNAs periodically exchange information as to an amount of packet data currently pending for transmission by the source and an amount of bandwidth resources currently available at the destination. In other words, flow control unit 149 of each HNA 111 communicates to the each other flow control unit 149 of each other HNAs 111 an amount of packet data currently pending within outbound queues 151 to be sent to that HNA, i.e., the amount of packet data for outbound tunnel packets constructed by one or more of routing instances 122 and destined for that HNAs. Similarly, each flow control unit 149 of each HNA communicates to each other flow control units 149 of each other HNAs 111 an amount of available memory resources within memory 153 for receiving packet data from that HNA. In this way, pair-wise flow control information is periodically exchanged and maintained for each source/destination pair of HNAs 111, such as for each source/destination pair-wise combinations of HNAs 17 of data center 10. Moreover, the flow control information for each HNA source/destination pair may specify the amount of data to be sent and the amount of bandwidth available on a per-output queue granularity. In other words, in the example where scheduler 148 for each HNA 111 maintains eight (8) output queues 151 for supporting eight (8) concurrent communication streams to each other HNA within data center 10, flow control unit 149 may maintain flow control information for each of the output queues for each source/destination pairwise combination with the other HNAs.

Scheduler 148 selectively transmits outbound tunnel packets from outbound queues 151 based on priorities associated with the outbound queues, the available bandwidth of network interface 106, and the available bandwidth and resources at the destination HNAs as reported by flow control unit 149.

In one example, flow control unit 149 modifies outbound tunnel packets output by virtual router 128 to embed flow control information. For example, flow control unit 149 may modify an outer header of each outbound tunnel packet to insert flow control information specific to the destination HNA for which the tunnel packet is destined. The flow control information inserted within the tunnel packet may inform the destination HNA an amount of data pending in one or more outbound queues 151 that destined for the destination HNA (i.e., one or more queue lengths) and/or an amount of space available in memory 153 for receiving data from the HNA to which the outbound tunnel packet is destined. In some example embodiments, the flow control information inserted within the tunnel packet specifies one or more maximum transmission rates (e.g., maximum transmission rates per priority) at which the HNA to which the tunnel packet is destined is permitted to send data to HNA 111.

In this way, exchange of flow control information between pairwise HNA combinations need not utilize separate messages which would otherwise consume additional bandwidth within switch fabric 14 of data center 10. In some implementations, flow control unit 149 of HNA 111 may output "heartbeat" messages to carry flow control information to HNAs within the data center (e.g., HNAs 12 of data center 10) as needed in situations where no output tunnel packets or insufficient data amounts (e.g., <4 KB) have been sent to those HNAs for a threshold period of time. In this way, the heartbeat messages may be used as needed to ensure that currently flow control information is available at all HNAs with respect to each source/destination pair-wise HNA combination. In one example, the heartbeat messages are constructed and scheduled to be sent at a frequency such that the heartbeat messages consume no more than 1% of the total point-to-point bandwidth provided by switch fabric 14 even in situations where no tunnel packets are currently being used.

In some embodiments, flow control unit 149 may modify an outer header of each outbound tunnel packet to insert sequence numbers specific to the destination HNA for which the tunnel packet is destined and to the priority level of the outbound queue 151 from which the tunnel packet is being sent. Upon receiving inbound tunnel packets, flow control unit 149 may reorder the packets and request retransmission for any missing tunnel packets for a given priority, i.e., associated with one of outbound queues 151, as determined based on the sequence number embedded within the tunnel header by the sending HNA and upon expiry of a timer set to wait for the missing tunnel packets. Furthermore, flow control unit 149 may maintain separate sequence numbers spaces for each priority. In this way, flow control units 149 of HNAs 17, for example, may establish and maintain robust packet flows between each other even though virtual routers 128 may utilize overlay forwarding techniques over off-the-shelf L2/L3 routing and switching components of switch fabric 14.

FIG. 5 is a block diagram illustrating, in detail, an example tunnel packet that may be processed host network accelerators according to techniques described in this disclosure. For simplicity and ease of illustration, tunnel packet 155 does not illustrate each and every field of a typical tunnel packet but is offered to highlight the techniques described herein. In addition, various implementations may include tunnel packet fields in various orderings.

In this example, "outer" or "tunnel" packet 155 includes outer header 156 and inner or "encapsulated" packet 157. Outer header 156 may include protocol or type-of-service (TOS) field 162 and public (i.e., switchable by the underling physical network for a virtual network associated with inner packet 157) IP address information in the form of source IP address field 164 and destination IP address field 166. A TOS field may define a priority for packet handling by devices of switch fabric 14 and HNAs as described herein. Protocol field 162 in this example indicates tunnel packet 155 uses GRE tunnel encapsulation, but other forms of tunnel encapsulation may be used in other cases, including IPinIP, NVGRE, VxLAN, and MPLS over MPLS, for instance.

Outer header 156 also includes tunnel encapsulation 159, which in this example includes GRE protocol field 170 to specify the GRE protocol (here, MPLS) and MPLS label field 172 to specify the MPLS label value (here, 214). The MPLS label field is an example of a virtual network identifier and may be associated in a virtual router (e.g., virtual router 128 of computing device 100 of FIG. 4) with a routing instance for a virtual network.

Inner packet 157 includes inner header 158 and payload 184. Inner header 158 may include protocol or type-of-service (TOS) field 174 as well as private (i.e., for a particular virtual routing and forwarding instance) IP address information in the form of source IP address field 176 and destination IP address field 178, along with transport layer information in the form of source port field 180 and destination port field 182. Payload 184 may include application layer (layer 7 (L7)) and in some cases other L4-L7 information produced by or for consumption by a virtual machine for the virtual network. Payload 184 may include and thus alternatively be referred to as an "L4 packet," "UDP packet," or "TCP packet."

In accordance with techniques described in this disclosure, when forwarding tunnel packet 155 as generated by a virtual router (e.g., virtual router 128), the host network accelerator may modify outer header 156 to include flow control information 185 that is specific to the HNA for which the tunnel packet is destined. In this example, flow control information 185 may include a first field 186 indicating to the receiving host network accelerator an amount of data pending in one or more outbound queues 151 used to store outbound tunnel packets destined for the destination HNA. For example, in the case where the HNAs support eight priority levels, and therefore eight outbound queues for each HNA within the data center, field 186 may specify the current amount of data within each of the eight outbound queues associated with the HNA to which tunnel packet 155 is destined.

In addition, flow control 185 includes a second field 187 indicating a transmission rate (e.g., bytes per second) at which the HNA to which tunnel packet 155 is destined is permitted to send data to the HNA sending tunnel packet 155. Further, flow control information 185 includes a third field 188 within which the sending HNA specifies a timestamp for a current time at which the HNA outputs tunnel packet 155. As such, the timestamp of tunnel packet 155 provides an indication to the receiving HNA as to how current or stale is flow control information 185.

For reordering of packets to facilitate drop-free packet delivery to outbound (e.g., PCIe) interfaces of the HNAs, outer header 156 illustrates an optional sequence number ("SEQ NO") field 189 that may include sequence number values for one or more priorities of a source HNA/destination HNA pair, specifically, the source HNA 111 and the destination HNA for tunnel packet 155. Each sequence number included in sequence number field 189 for a priority may be a 2 byte value in some instances. Thus, in instances in which HNAs implement 4 priorities, sequence number field 189 would be an 8 byte field. Upon receiving inbound tunnel packets 155 including a sequence number field 189, flow control unit 149 may reorder the packets 155 and request retransmission for any missing tunnel packets for a given priority, i.e., associated with one of outbound queues 151, as determined based on the corresponding sequence number value of sequence number field 189 embedded within the outer header 156 by the sending HNA and upon expiry of a timer set to wait for the missing tunnel packets. As noted, flow control unit 149 may maintain separate sequence numbers spaces for each priority. In this way, flow control units 149 of HNAs 17, for example, may establish and maintain robust packet flows between each other even though virtual routers 128 may utilize overlay forwarding techniques over off-the-shelf L2/L3 routing and switching components of switch fabric 14.

A host network accelerator 111 may be set up with a large amount of buffer memory, e.g., in memory 153, for receiving packets to permit storing of a long series of packets having missing packets. As a result, HNA 111 may reduce the need to send a retransmission while waiting for missing tunnel packets 155. Memory 153 includes one or more computer-readable storage media, similar to main memory 144.

FIG. 6 is a block diagram illustrating, in detail, an example packet structure that may be used host network accelerators for maintaining pairwise "heart beat" messages for communicating updated flow control information in the event tunnel packets (e.g., FIG. 5) are not currently being exchanged through the overlay network for a given HNA source/destination pair. In this example, heartbeat packet 190 includes an Ethernet header 192 prepended to an IP header 194 followed by a payload 193 containing flow control information 195. As in FIG. 5, flow control information 195 includes a first field 186 indicating a current amount of data in each of the outbound queue associated with the HNA to which packet 190 is destined. In addition, flow control information 195 includes a second field 197 indicating a permitted transmission rate (e.g., bytes per second) and a third field 188 for specifying a timestamp for a current time at which the HNA outputs packet 190.

In one example, the packet structure for the heartbeat packet 190 may conform to the format set out in Table 1:

TABLE 1

Heartbeat Packet Format

| FIELD | SIZE |
|---|---|
| Preamble | 7 Bytes |
| Start of Frame | 1 Byte |
| SRC and DST MAC Addresses | 12 Bytes |
| EtherType | 2 Bytes |
| Frame Checksum | 2 Bytes |
| IP Header | 20 Bytes |
| Queue Lengths | 8 Bytes |
| Permitted Rates | 8 Bytes |
| Timestamp | 4 Bytes |

In this example, heartbeat packet 190 may be implemented as having a 64 byte total frame size, i.e., an initial 24 byte Ethernet frame header, a 20 byte IP header and a payload of 20 bytes containing the flow control information. Queue Lengths and Permitted Rates are each 8 Byte fields. In this instance, the 8 Bytes are divided evenly among 4 different priorities implemented by the HNAs (again, for this example implementation). As a result, each Queue Length and Permitted Rate per priority is a 16-bit value. Other levels of precision and numbers of priorities are contemplated.

In another example, the packet structure for the heartbeat packet 190 may conform to the format set out in Table 2:

TABLE 2

Heartbeat Packet Format

| FIELD | SIZE |
|---|---|
| Preamble | 7 Bytes |
| Start of Frame | 1 Byte |
| SRC and DST MAC Addresses | 12 Bytes |

TABLE 2-continued

Heartbeat Packet Format

| FIELD | SIZE |
|---|---|
| EtherType | 2 Bytes |
| Frame Checksum | 2 Bytes |
| IP Header | 20 Bytes |
| Queue Lengths | 8 Bytes |
| Permitted Rates | 8 Bytes |
| Timestamp | 4 Bytes |
| Sequence Number | 8 Bytes |

In this example, heartbeat packet 190 has a format similar to that presented by Table 1 but further includes an optional 8 byte sequence number ("SEQ NO") field 199 that includes sequence numbers for the 4 different priorities implemented by the HNAs for this example implementation. Sequence number field 199 has a similar function as sequence number field 189 of tunnel packet 155.

The use by flow control unit 149 of flow control and sequence numbering according to techniques described herein may provide for multipoint-to-multipoint, drop-free, and scalable physical network extended to virtual routers 128 of HNAs operating at the edges of the underlying physical network and extending one or more virtual networks to virtual machines 110. As a result, virtual machines 110 hosting user applications for various tenants experience high-speed and reliable layer 3 forwarding at the virtual network edge as provided by the HNAs implementing virtual routers 128.

FIG. 7 is a block diagram illustrating a conceptual diagram 200 of host network accelerators (HNAs) interconnected by a switch fabric in a mesh topology for scalable, drop-free, end-to-end communications between HNAs in accordance with techniques described herein. As described above, the HNAs implement one or more virtual networks over the physical networks by tunneling layer 3 packets to extend each virtual network to its associated hosts. In the illustrated conceptual diagram, source HNAs 17A$_S$-17N$_S$ (collectively, "source HNAs 17$_S$") each represent a host network accelerator operating as a source endpoint for the physical network underlying the virtual networks. Destination HNAs 17A$_D$-17N$_D$ (collectively, "destination HNAs 17$_D$") each represent a same HNA device as a corresponding HNA of source HNAs 17$_S$, but operating as a destination endpoint for the physical network. For example, source HNA 17B$_S$ and destination HNA 17B$_D$ may represent the same physical HNA device located and operating within a TOR switch or server rack and both potentially sending and receiving IP packets to/from switch fabric 204. However, for modeling and descriptive purposes herein the respective sending and receiving functionality of the single HNA device is broken out into separate elements and reference characters. Source HNAs 17$_S$ may represent any of HNAs 17 of FIGS. 1-2, HNAs 60 of FIG. 3A, HNAs 74 of FIG. 3B, and HNA 111 of FIG. 4.

Source HNAs 17$_S$ and destination HNAs 17$_D$ implement flow control techniques described herein to facilitate scalable and drop-free communication between HNA source/destination pairs. For purposes of description, the flow control techniques are initially formulated with respect to a simplified model that uses a perfect switch fabric 204 (which may represent a "perfect" implementation of switch fabric 14) having infinite internal bandwidth and zero internal latency. Perfect switch fabric 204 operates conceptually as a half-duplex network with N input ports of constant unit 1 bandwidth and N output ports of constant unit 1 bandwidth. The source HNAs $17_S$ present a set of injection bandwidths $I_{i,j}$, where i indexes the source HNAs $17_S$ and j indexes the destination HNAs $17_D$. In this simplified model, $I_{i,j}(t)$ is constant for a given i,j.

Ideally, packets arrive instantaneously from any given one of source HNAs $17_S$ to any given one of destination queues 206A-206N (collectively, "destination queues 206") having infinite input bandwidth and a constant unit 1 output bandwidth, in accordance with the simplified model. This simplified model is however in some ways commensurate with example implementations of a data center 10 in which HNAs 17 are allocated significantly more resources for receive buffering of packets than for transmit buffering of packets. The measured bandwidth allocated by a given destination HNA of destination HNAs $17_S$ associated with a destination queue of destination queues 206 will be proportional to the current amount of data (e.g., number of bytes) in the destination queue from different source HNAs of source HNAs $17_S$. For instance, the measured bandwidth allocated by a destination HNA $17B_D$ associated with destination queue 206B will be proportional to the number of bytes in the destination queue from different source HNAs of source HNAs $17_S$. Let $q_1, q_2, \ldots q_N$ represent the number of bytes from various source HNAs $17_S$ represented as $S_1, S_2, \ldots, S_N$. The rate allocated by the given destination HNA $17B_D$ to source HNA $S_i$, in order to achieve the aforementioned proportionality is indicated by the following (again, for the given destination HNA $17B_D$):

$$\text{rate}(S_i) = \frac{q_i}{\sum_{i=1}^{N} q_i} \quad (1)$$

$$\sum_{i=1}^{N} \text{rate}(S_i) = 1 \quad (2)$$

and thus

If $\sum_{i=1}^{N} q_i = 0$, then $\text{rate}(S_i) = 0$ and the bandwidth is defined to be 0 for the given destination HNA $17B_D$.

Figure 8:
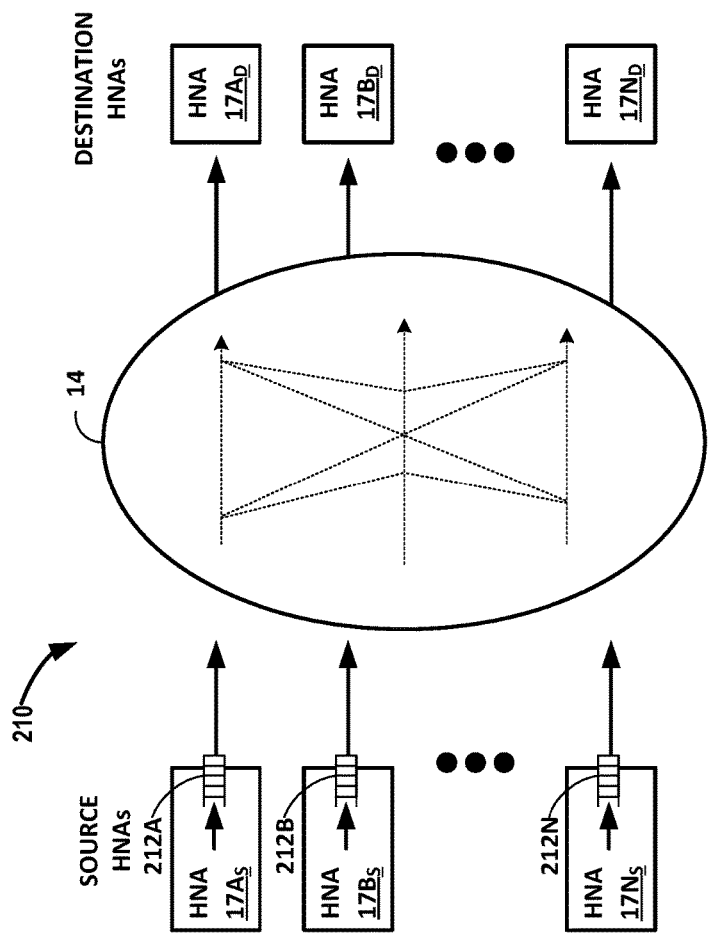
FIG. 8 is a block diagram illustrating a system in which host network accelerators (HNAs) interconnect by a switch fabric in a mesh topology for scalable, drop-free, end-to-end communications between HNAs in accordance with techniques described herein.

FIG. 8 is a block diagram illustrating a system in which host network accelerators (HNAs) interconnect by a switch fabric in a mesh topology for scalable, drop-free, end-to-end communications between HNAs in accordance with techniques described herein. As described above, the HNAs implement one or more virtual networks over the physical networks by tunneling layer 3 packets to extend each virtual network to its associated hosts. In the illustrated system 210, source HNAs $17A_S$-$17N_S$ (collectively, "source HNAs $17_S$") each represent a host network accelerator operating as a source endpoint for the physical network underlying the virtual networks. Destination HNAs $17A_D$-$17N_D$ (collectively, "destination HNAs $17_D$") each represent a same HNA device as a corresponding HNA of source HNAs $17_S$, but operating as a destination endpoint for the physical network. For example, source HNA $17B_S$ and destination HNA $17B_D$ may represent the same physical HNA device located and operating within a TOR switch or server rack and both potentially sending and receiving IP packets to/from switch fabric 14. However, for modeling and descriptive purposes herein the respective sending and receiving functionality of the single HNA device is broken out into separate elements and reference characters. Source HNAs $17_S$ may represent any of HNAs 17 of FIGS. 1-2, HNAs 60 of FIG. 3A, HNAs 74 of FIG. 3B, and HNA 111 of FIG. 4. System 210 may represent data center 10 of FIG. 1, for instance.

Source HNAs $17_S$ and destination HNAs $17_D$ implement flow control techniques described herein to facilitate scalable and drop-free communication between HNA source/destination pairs. Unlike "perfect" switch fabric 204 of FIG. 7, switch fabric 14 represents a realistic L2/L3 network as described above, e.g., with respect to FIG. 1. That is, switch fabric 14 has a finite bandwidth and non-zero latencies between HNA source/destination pairs.

System 210 illustrates source HNAs $17A_S$-$17N_S$ having respective outbound queue sets 212A-212N (collectively, "queues 212") to buffer packets queued for transmission by any of source HNAs $17_S$ via switch fabric 14 to multiple destination HNAs $17_D$ for hardware-based virtual routing to standalone and/or virtual hosts as described herein. Each of queues sets 212 may represent example outbound queues 151 of FIG. 4 for a single priority. Queue sets 212 are First-In-First-Out data structures and each queue of one of queue sets 212 has a queue length representing an amount of data, i.e., the number of bytes (or in some implementations a number of packets or other construct), that is enqueued and awaiting transmission by the corresponding source HNA $17_S$. Although described primarily herein as storing "packets," each queue of queues sets 212 may store packets, references to packets stored elsewhere to a main memory, or other object or reference that allows for the enqueuing/dequeuing of packets for transmission. Moreover, queue sets 212 may store packets destined for any of destination HNAs $17_D$. For example, a queue of queue set 212A may store a first packet of size 2000 bytes destined for destination HNA $17A_D$ and a second packet of size 3000 bytes destined for destination HNA $17B_D$. The queue's actual queue length is 5000 bytes, but the measured queue length may be rounded up or down to a power of two to result in a measured queue length ("queue length") of $2^{12}=4096$ or $2^{13}=8192$. "Queue length" may alternatively be referred to elsewhere herein as "queue size."

Figure 9:
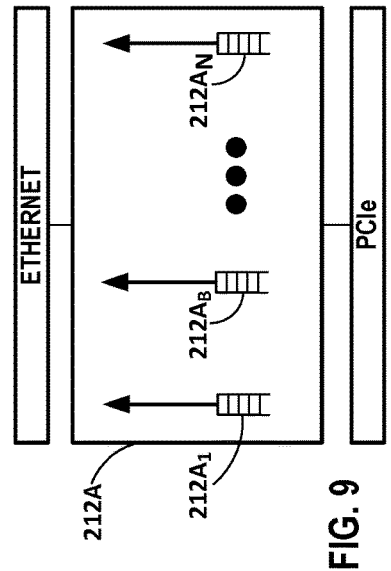
FIG. 9 is a block diagram illustrating data structures for host network accelerators, according to techniques described in this disclosure.

An example of queue sets 212A is illustrated in FIG. 9, which illustrates a corresponding queue of source HNA $17A_S$ for each of destinations HNA $17_D$. Queue $212A_1$ is a queue for destination HNA $17A_D$ (which may be the same HNA 17A), queue $212A_B$ is a queue for destination HNA $17B_D$, and so on. Queue set 212A may include many hundreds or even thousands of queues and may be implemented using any suitable data structure, such as a linked list. Returning to FIG. 10, in order to facilitate efficient allocation of the finite bandwidth of switch fabric 14 and drop-free, scalable end-to-end communication between source HNAs $17_S$/destination HNAs $17_D$ pairs, source HNAs $17_S$ report the queue lengths of respective queue sets 212 to corresponding destination HNAs $17_D$ to report an amount of data that is to be sent to the destinations. Thus, for instance, source HNA $17A_S$ having queue set 212A may report the queue length of $212A_1$ to destination HNA $17A_D$, report the queue length of $212A_B$ to destination HNA $17B_D$, and so on.

Figure 10B:
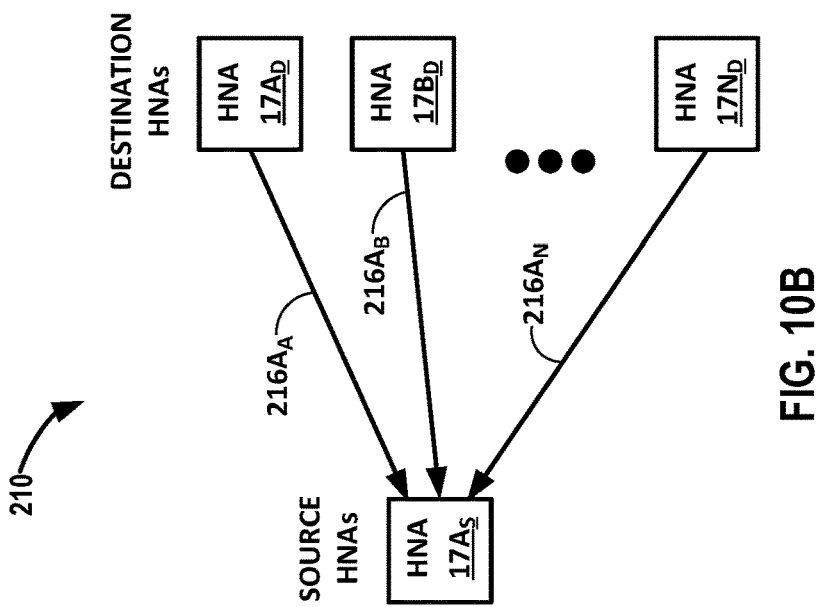
FIGS. 10A-10B are block diagram illustrating example flow control messages exchanged between HNAs according to techniques described in this disclosure.
Figure 10A:
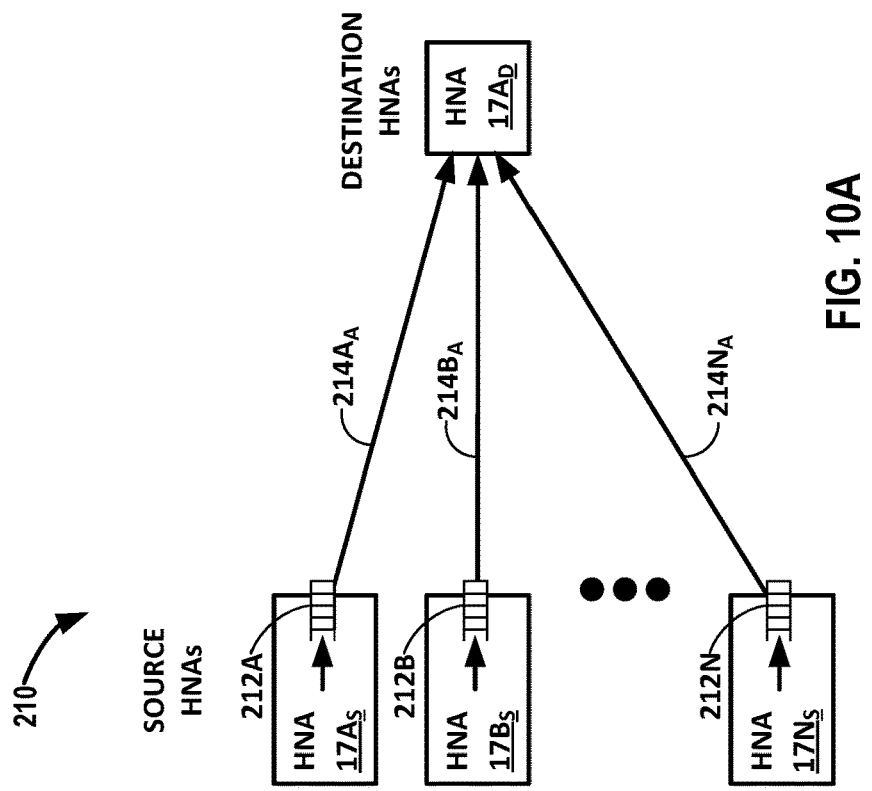

FIG. 10A illustrates destination HNAs $17A_D$ receiving corresponding queue lengths in queue length messages $214A_A$-$214N_A$ reported by each of source HNAs $17_S$. For ease of illustration, only destination HNA $17A_D$ is shown receiving its corresponding queue length messages from source HNAs $17_S$. Because system 210 is a multipoint-to-multipoint network of HNAs 17, there will be queue length messages issued by each of source HNA $17_S$ to each of destination HNAs $17_D$. Let $q_{i,j}$ be the queue length communicated from a source $S_i$ of source HNAs $17_S$ to a destination $D_j$ of destination HNAs $17_D$ for all i,j ∈ N, where N is the number of HNAs 17. Queue length message 214X$_Y$ may transport $q_{i,j}$ where X=i and Y=j for all i,j ∈ N.

Destination $D_j$ allocates its receive bandwidth among source HNAs 17$_S$ in proportion to the amount of data to be sent by each of source HNAs 17$_S$. For example, destination $D_{1j}$ may allocate its receive bandwidth by the queue lengths it receives from each of source HNAs 17$_S$ according to the following formula:

$$r_{i,j} = \frac{q_{i,j}}{\sum_{l=1}^{N} q_{l,j}}, \qquad (3)$$

where $r_{i,j}$ is the rate of transmission from a source $S_i$ to a destination $D_j$, as allocated by the destination $D_j$ from its receive bandwidth. It is straightforward to show that $\Sigma_{i=1}^{N} r_{i,j}$=1, unless $\Sigma_{l=1}^{N} q_{l,j}$=0. Each destination $D_j$ of destination HNAs 17$_D$ then communicates a representation of $r_{i,j}$ computed for source $S_i$ to the corresponding source HNAs 17$_S$. Each of source HNAs 17$_S$ therefore receive computes rates r from each of destinations $D_j$ for j ∈ N. FIG. 10B illustrates source HNA 17B$_S$ receiving rate messages 216A$_A$-216A$_N$ from destination HNAs 17$_D$. For concision and ease of illustration, only rate messages 216A$_A$-216A$_N$ to source HNA 17A$_S$ are shown. However, because system 210 is a multipoint-to-multipoint network of HNAs 17, there will be rate messages issued by each of destination HNA 17$_D$ to each of source HNAs 17$_S$. Rate message 216X$_Y$ may transport $r_{i,j}$ where X=i and Y=j for all i,j ∈ N. Rate messages 216 and queue length messages 214 may each be an example of a heartbeat message 190 or other message exchanged between source and destination HNAs 17 that includes the flow control information 185 described with respect to FIG. 5, where field 186 includes a rate $r_{i,j}$ and field 187 includes a queue length $q_{i,j}$.

Source HNAs 17$_S$ allocate transmit bandwidth for outbound traffic transported via switch fabric 14 in proportion to the rates that received from the various destination HNAs 17$_D$. For example, because each source $S_i$ of source HNAs 17$_S$ receives rates $r_{i,j}$ from each of destinations $D_j$ for i,j ∈ N, source $S_i$ may allocate the actual bandwidth it sends according to the following formula:

$$\hat{r}_{i,j} = r_{i,j} \text{ if } \sum_{l=1}^{N} r_{i,l} \le 1, \text{ or} \qquad (4)$$
$$\hat{r}_{i,j} = \frac{r_{i,j}}{\sum_{l=1}^{N} r_{i,l}} \text{ if } \sum_{l=1}^{N} r_{i,l} > 1,$$

where $\hat{r}_{i,j}$ denotes the actual bandwidth to be sent by source $S_i$ to destination $D_j$.

This allocates facilitates the goals of scalable, drop-free, end-to-end communications between HNAs, for the maximum rate that source $S_i$ may send to destination $D_j$ is $r_{i,j}$, as determined by the destination $D_j$ and reported to the source $S_i$ in one of rate message 216. However, the source $S_i$ may have insufficient transmit bandwidth to achieve $r_{i,j}$, if the source $S_i$ has other commitments to other destinations. Consider an example where there is a single source HNA 17A$_S$ and two destination HNAs 17A$_D$-17B$_D$, where both destination HNAs 17A$_D$-17B$_D$ each indicate that they can accept a rate of 1 (i.e., they have no other source commitments, for no other sources intend to transmit to them as indicated in queue length messages 214). However, source HNA 17A$_S$ is unable to deliver a rate of 2 because it is constrained to a rate of 1 (here representing the maximum transmit bandwidth or rate of injection I into switch fabric 14 for source HNA 17A$_S$ for ease of description). Instead, source HNA 17A$_S$ may proportionally allocate its transmit bandwidth among destination HNAs 17A$_D$-17B$_D$ according to Equation (4). This results in $\hat{r}$=½ to each of destination HNAs 17A$_D$-17B$_D$. Continuing the example and letting $r_A$ be the rate indicated by destination HNA 17A$_D$ and $r_B$ be the rate indicated by destination HNA 17B$_D$, source HNA 17A$_S$ computes $$\hat{r}_A = \frac{r_A}{r_A + r_B}$$

and computes $$\hat{r}_B = \frac{r_B}{r_A + r_B}$$

according to Equation (4). This satisfies the injection constraint of bandwidth ≤1 and the accepted ejection constraints of $r_A$ and $r_B$, for each of actual transmit bandwidth computed for each of these indicated rates is less that the rate itself because $r_A+r_B$>1. These results hold for examples in which the transmit and receive bandwidths of the HNAs 17 are of different bandwidths than 1.

This formulation leads to the following rules:
(1) A destination determines how to allocate bandwidth to sources. No source may exceed its bandwidth allocated by a destination (rate r-expressed in bytes/s (B/s)) to that destination.
(2) A source may determine to send less than its allocated bandwidth (rate r) to a given destination due to commitments to other destinations.

Below is a summary of the notation scheme used herein:
(1) $q_{ij}$=The number of bytes in a virtual output queue (VOQ) in source $S_i$ directed toward destination $D_j$. The VOQs may be another term for queue sets 212 in FIGS. 8-10B.
(2) $r_{i,j}$=The number of bytes/s that source $S_i$ should send to destination $D_j$ as determined by the destination $D_j$.
(3) $\hat{r}_{i,j}$=The number of bytes/s that source $S_i$ will actually send to destination $D_j$ after normalization by the source $S_i$. Equation (4) is an example of at least part of normalization.

The exchange of flow control information will now be described in further detail. Source HNAs send data packets to destination HNAs via switch fabric 14. First, flow control unit 149 of a source HNA may embed, in every packet sent from the source HNA to a destination HNA, the queue length for a queue of queue sets 212 associated with the destination HNA. Second, for every L bytes received by a destination HNA from a particular source HNA, the flow control unit 149 of the destination HNA returns an acknowledgement that include the rate r computed for that source HNA/destination HNA pair. In some examples, L=4 KB.

In order to (1) potentially reduce a time for a source HNA to ramp up to full speed, and (2) prevent deadlock in the case the L bytes or the acknowledgement messages are lost, flow control unit 149 of source HNAs periodically send flow control information to destination HNAs, and flow control unit 149 of destination HNAs periodically send flow control information to the source HNAs. For example, an administrator may configure a 2 Gbps channel out of a 200 Gbps switch fabric (or 1% of the overall bandwidth) for periodic flow control exchange of heartbeat packets, such as heartbeat packets 190 of FIG. 6.

The heartbeat packets 190 serve as keep-alives/heartbeats from source HNAs to destination HNAs and include queue length information q from sources to destinations, e.g., in queue length field 196. Heartbeat packets 190 also include rate information r from destinations to sources, e.g., in rate field 197, keeping in mind that every destination HNA is also a source HNA and vice-versa. Thus a single heartbeat packet 190 may include both queue length information from a source to a destination and rate information from that destination to that source. This has the salutary effect of amortizing the cost of heartbeat packet 190 overhead of an Ethernet and IP header.

The heartbeat packets 190 further include a timestamp. In some cases, heartbeat packets 190 may be forwarded at network priority, which is the lowest-latency/highest-priority. The timestamp may permit the HNAs to synchronize their clocks with a high degree of precision. The total size for a heartbeat packet 190 is described in Table 1, above, for HNAs that provide 4 priority channels. The Queue lengths and Permitted Rate field sizes (in bytes) for Table 1 will be smaller/larger for fewer/more priority channels. Table 1, for instance, shows 8 bytes allocated for Queue Length. As described in further detail below, for 16-bit granularity (i.e., n=16), 8 bytes provides space for 4 different Queue Lengths for corresponding priority values. The analysis for Permitted Rate is similar.

The total frame size of a heartbeat packet 190, per Table 1, may be 64 bytes=512 bits. As such, at 2 Gbps (the allocated channel bandwidth) this resolves to ~4M frames/s or 250 ns between successive heartbeat packets 190. Assuming that each HNA has a "span" of (i.e., is communicating with) ~100 HNAs, then in the worst case the queue length and rate information may be stale by 250 ns*100=25 HNAs do not need to send a heartbeat packet 190, however, if sufficient data is timely transmitted with piggybacked flow control information to meet the timing constraints laid out above. Thus, the flow control information may frequently be more current than 25 μs. Still further, even if a message including the flow control information is dropped in the switch fabric 14, such flow control information may be provided in the next packet.

Figure 11:
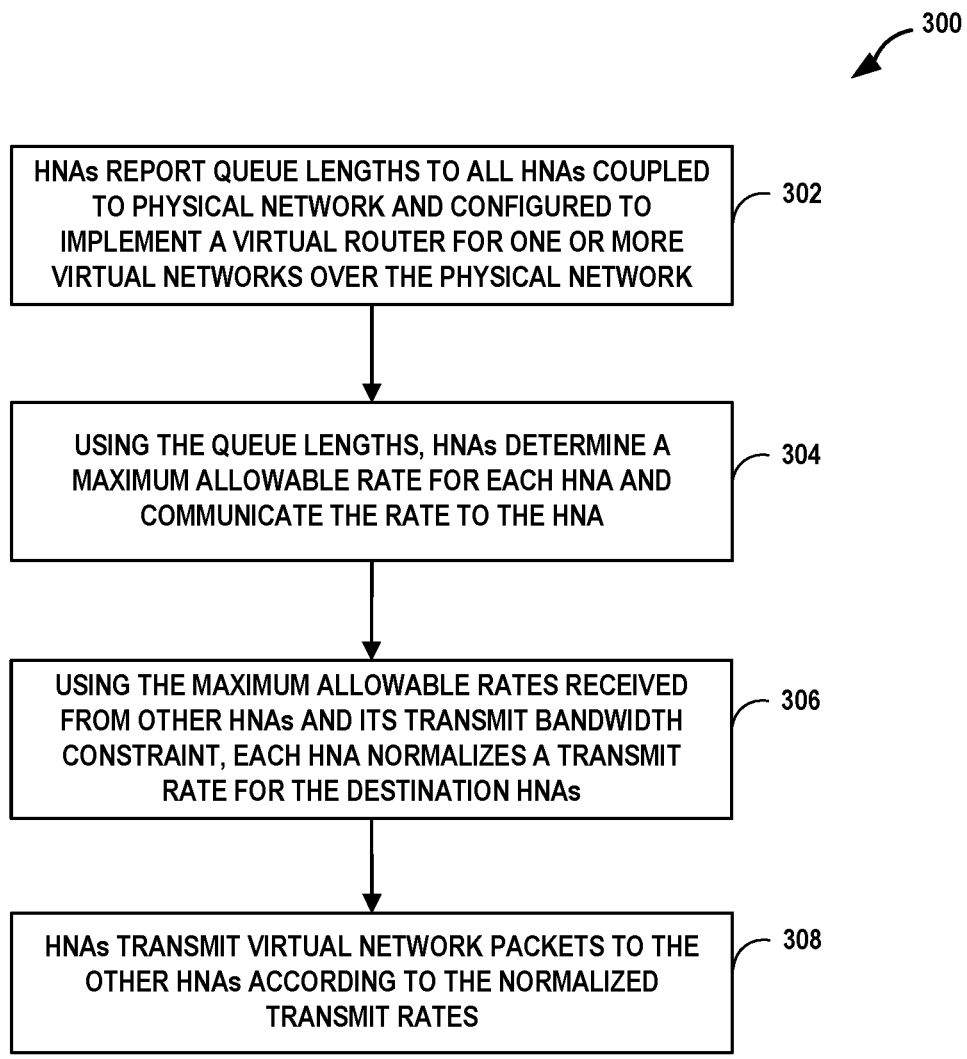
FIG. 11 is a flowchart of an example mode of operation by host network accelerators to perform flow control according to techniques described in this disclosure.

FIG. 11 is a flowchart of an example mode of operation by host network accelerators to perform flow control according to techniques described in this disclosure. The example mode of operation 300 is described, for illustrative purposes, with respect to HNA 111 of computing device 100 operating as an HNA 17 of system 210 of FIGS. 7-10B. Each source $S_i$ reports a queue length $q_{i,j}$ (e.g., in bytes) to destination $D_j$ for i,j ∈ N. That is, flow control unit 149 of multiple instances of computing device 100 operating as source HNAs $17_S$ generates or modifies packets to include queue lengths for queues 151 and transmits the corresponding queue lengths to the multiple instances of computing devices 100 operating as destination HNAs $17_D$ (these may be the same HNAs as source HNAs $17_S$) (302). These packets may be included in or otherwise represented by queue length messages 214 of FIG. 10A. Each destination $D_j$ determines and reports a rate $r_{i,j}$ (in bytes/s, e.g.) to each source $S_i$ for i,j ∈ N. That is, using the reported queue lengths, flow control unit 149 of the computing devices 100 operating as destination HNAs $17_D$ may determine rates by proportionally allocating receive bandwidth according to the queue length that represent an amount of data to be sent from each source HNA. The flow control unit 149 generate or modify packets to transmit the determined, corresponding rates to the multiple instances of computing devices 100 operating as source HNAs $17_S$ (304). These packets may be included in or otherwise represented by rate messages 216. Each source $S_i$ normalizes the rates to determine actual, normalized rates to satisfy the finite bandwidth constraint, $B_i$ of the source $S_i$. That is, flow control unit 149 of the computing devices 100 operating as source HNAs $17_S$ proportionally allocate an overall transmit bandwidth according to the rates received from the various destinations (306). A source $S_i$ determines the normalized rate $\hat{r}_{i,j}$ from $S_i$ to destination $D_j$ as follows:

$$\hat{r}_{i,j} = \frac{r_{i,j} B_i}{\sum_{j=1}^{N} r_{i,j}} \tag{5}$$

It is straightforward to show that $\sum_{j=1}^{N} \hat{r}_{i,j} = B_i$. Scheduler 148 may apply the normalized rates determined by each HNA 111 for the various destination HNAs. In this way, computing devices 100 performing the mode of operation 300 may facilitate efficient allocation of the finite bandwidth of switch fabric 14 and drop-free, scalable end-to-end communication between source HNAs $17_S$/destination HNAs $17_D$ pairs.

A number of examples of mode of operation 300 of FIG. 11 are now described. The following compact matrix notation is hereinafter used to provide an alternative representation of the queue lengths and the rates:

$$Q = \begin{bmatrix} q_{11} & \cdots & q_{1N} \\ q_{N1} & \cdots & q_{NN} \end{bmatrix},$$

$$R = \begin{bmatrix} r_{11} & \cdots & r_{1N} \\ r_{N1} & \cdots & r_{NN} \end{bmatrix},$$

$$\hat{R} = \begin{bmatrix} \hat{r}_{11} & \cdots & \hat{r}_{1N} \\ \hat{r}_{N1} & \cdots & \hat{r}_{NN} \end{bmatrix}.$$

Each source $S_i$ is also a destination $D_i$ and has bandwidth $B_i$. In some examples, $q_{i,j}$ is communicated as an n-bit value that is scaled according to a configured queue scale value, $qu_i$ bytes. In other words, $q_{i,j}$ may be measured in units of $qu_i$ bytes, where $qu_i$ may be a power of 2. In some cases, $q_{i,j}$ may be included in field 186 of tunnel packet 155. In some examples, $r_{i,j}$ is communicated as an k-bit value that is scaled according to a configured rate scale value, $ru_i$ bps. In other words, $r_{i,j}$ may be measured in units of $ru_i$ bytes/s, where $ru_i$ may be a power of 2. In some cases, $r_{i,j}$ may be included in field 187 of tunnel packet 155. As an example computation of scaled ranges, for qu=64B and n=16 bits, $q_{min}$ is 0 and $q_{max}$ is $2^6 * 2^{16} = 2^{22} \Rightarrow 4$ MB. As another example, for ru=16 MB/s=128 Mbps and k=16 bits, $r_{min}$ is 0 and $r_{max}$ is $128*2^{16} \Rightarrow 8$ Tbps.

Scaling the queue length and rate values in this way, for each of HNAs 17, may facilitate an appropriate level of granularity for the ranges of these values for the various HNAs coupled to the switch fabric 14, according to the capabilities of the HNAs with respect to memory capacity, speed of the HNA device, and so forth. In some examples, configuration data 134 of HNA 111 of FIG. 4 stores $qu_i$, $ur_i$ for all i ∈ N (i.e., for every HNA 17 coupled to the switch fabric 14). As described above, configuration data 134 may be set by a controller 22 or, in some cases, may be exchanged among HNAs 17 for storage to configuration data 134, where is it accessible to flow control unit 149 for the HNAs.

The description for flow control operations described herein may in some examples occur with respect to multiple priorities. Accordingly, field 187 may include a value for $r_{i,j}$ for each of priorities 1–p, where p is a number of priorities offered by the HNAs 17 coupled to switch fabric 14. Likewise, field 186 may include a value for $q_{i,j}$ for each of priorities 1–p. p. Example values of p include 2, 4, and 8, although other values are possible.

Figure 12A:
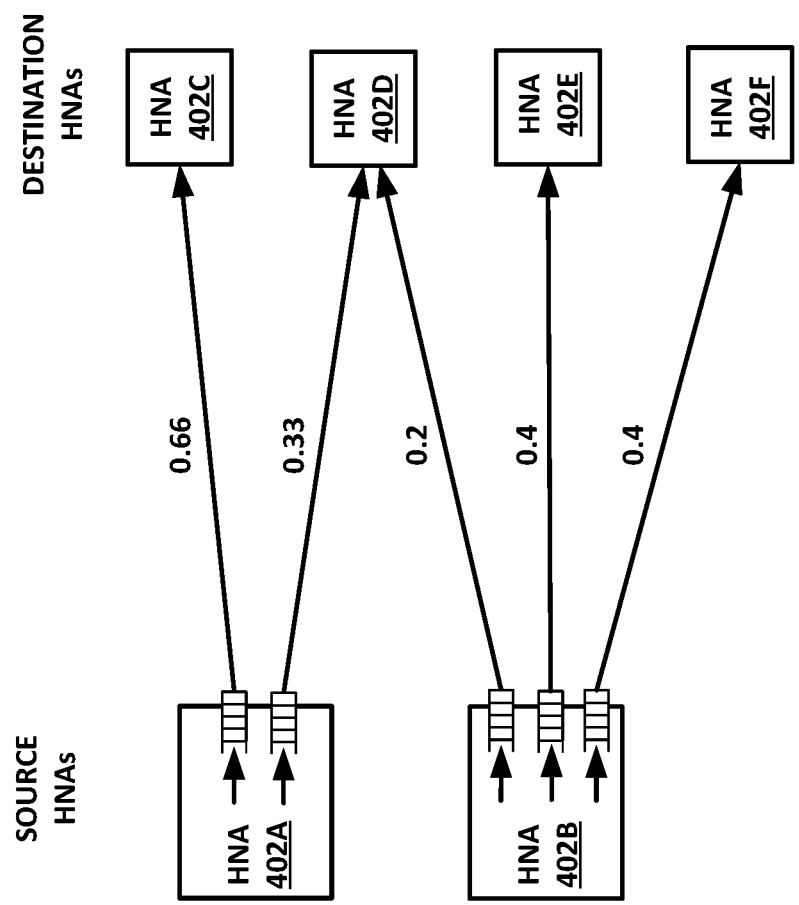
FIGS. 12A-12B are block diagrams illustrating an example system in which host network accelerators apply flow control according to techniques described herein.

FIG. 12A is a block diagram illustrating an example system in which host network accelerators apply flow control according to techniques described herein. Each HNA from source HNAs 402A-402B and destination HNAs 402C-402F may represent examples of any of HNAs 17 described herein. Source HNAs 402A-402B and destination HNAs 402C-402F exchange queue length and rate values determined according to flow control techniques described herein in order to proportionally allocate bandwidth by the amounts of data to send and the capacities of destination HNAs 402C-402F to receive such data. Source HNA 402A has data to transmit to destination HNAs 402C, 402D and such data is being enqueued at a rate that meets or exceeds the maximum transmission rate of source HNA 402A. In other words, source HNA 402A is at maximum transmission capacity. Source HNA 402B has data to transmit to destination HNAs 402D, 402E, and 402F and such data is being enqueued at a rate that meets or exceeds the maximum transmission rate of source HNA 402B. In other words, source HNA 402B is at maximum transmission capacity.

For a first example determination with respect to FIG. 12A, it is assumed that all queues have the same queue length for simplicity. Setting the illustrated queue lengths to unit 1 for Q results in source HNAs 402A, 402B computing:

$$R = \begin{bmatrix} 1 & 1/2 & 0 & 0 \\ 0 & 1/2 & 1 & 1 \end{bmatrix},$$

where the i=2 rows represent source HNAs 402A-402B and the j=4 columns represent destination HNAs 402C-402F. Because the columns sum to 1, the destination bandwidth constraints for destination HNAs 402C-402F are satisfied. Source HNAs 402A-402B normalize the rows, however, because the rows do not sum to 1:

$$\hat{R} = \begin{bmatrix} 1/1.5 & 0.5/1.5 & 0 & 0 \\ 0 & 0.5/2.5 & 1/2.5 & 1/2.5 \end{bmatrix} = \begin{bmatrix} 0.66 & 0.33 & 0 & 0 \\ 0 & 0.2 & 0.4 & 0.4 \end{bmatrix}.$$

This result is illustrated on FIG. 12A.

As a second example determination with respect to FIG. 12A, the queue lengths are set as:

$$Q = \begin{bmatrix} 1 & 0.6 & 0 & 0 \\ 0 & 0.4 & 1 & 1 \end{bmatrix}.$$

By computing Equation (3) for each element, destination HNAs 402C-402F determine R to be:

$$R = \begin{bmatrix} 1 & 0.6 & 0 & 0 \\ 0 & 0.4 & 1 & 1 \end{bmatrix}$$

and report to the source HNAs. By computing Equation (4) for each element, source HNAs 402A-402B determine $\hat{R}$ to be:

$$\hat{R} = \begin{bmatrix} 1/1.6 & 0.6/1.6 & 0 & 0 \\ 0 & 0.4/2.4 & 1/2.4 & 1/2.4 \end{bmatrix} = \begin{bmatrix} 0.625 & 0.375 & 0 & 0 \\ 0 & 0.16 & 0.416 & 0.416 \end{bmatrix}.$$

Figure 12B:
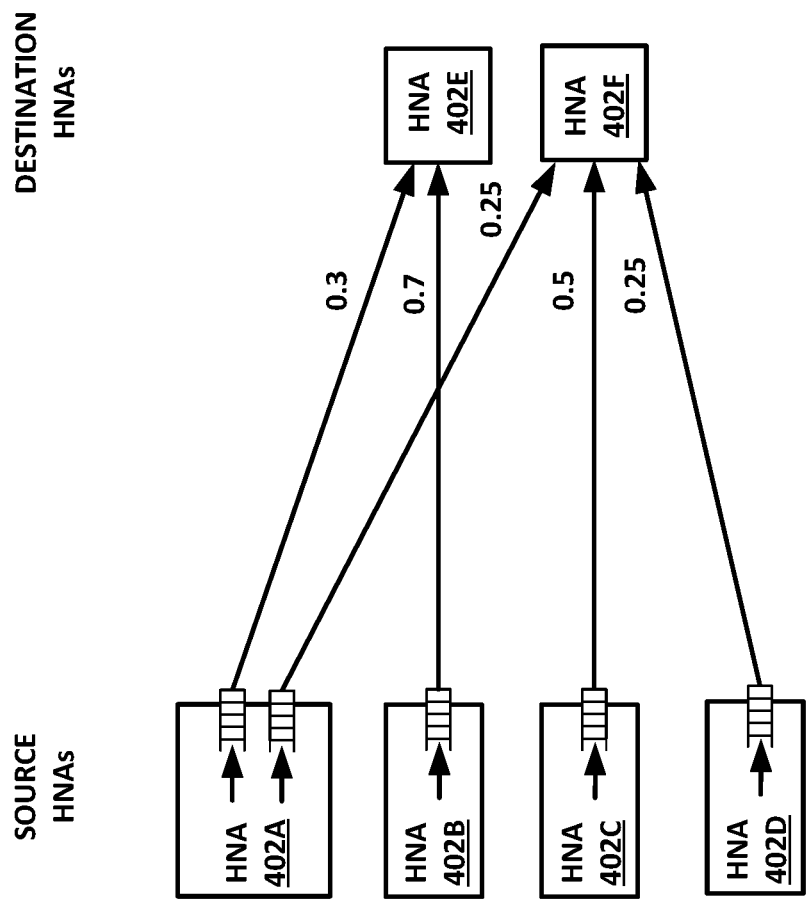

FIG. 12B is a block diagram illustrating another example system in which host network accelerators apply flow control according to techniques described herein. FIG. 12B illustrates a conceptual topology for the HNAs of FIG. 12A for different queue lengths. Here, source HNA 402A has data to transmit to destination HNAs 402E, 402F; source HNA 402B has data to transmit to destination HNA 402E; source HNA 402C has data to transmit to destination HNA 402F; and source HNA 402D has data to transmit to destination HNA 402F. In this example, the receive bandwidths meet or exceed the maximum receive rate of the destination HNAs 402E, 402F.

Here, destination HNAs 402E, 402F compute R to be $$R = \begin{bmatrix} 0.3 & 0.25 \\ 0.7 & 0 \\ 0 & 0.5 \\ 0 & 0.25 \end{bmatrix}$$

and report to the source HNAs. By computing Equation (4) for each element, source HNAs 402A-402D determine $\hat{R}$ to be:

$$\hat{R} = \begin{bmatrix} 0.3 & 0.25 \\ 0.7 & 0 \\ 0 & 0.5 \\ 0 & 0.25 \end{bmatrix}.$$

$R = \hat{R}$ in this case, for the constraints are already satisfied and no normalization is in fact needed. That is, if and only if a row of the R matrix exceeds the transmission constraint is normalization needed for that row. Source HNAs 402A-402D may in some cases eschew normalization, therefore, if the row is within the transmission constraint for the source HNA. This is in accord with Equation (4).

By efficiently and fairly allocating receive and transmit bandwidths for HNAs operating at the edge of a physical network, e.g., switch fabric 14, a data center 10 provider may offer highly-scalable data center services to multiple tenants to make effective use of a large amount of internal network bandwidth. Coupling these services with flow control further provided by the HNAs, as described above, may facilitate multipoint-to-multipoint, drop-free, and scalable physical networks extended to virtual routers 128 of HNAs operating at the edges of the underlying physical network. Extending one or more virtual networks by virtual routers 128 to virtual machines 110 may consequently provide transparent, highly-reliable, L2/L3 switching to hosted user applications in a cost-effective manner due to the use of off-the-shelf component hardware within switch fabric 14.

Figure 13:
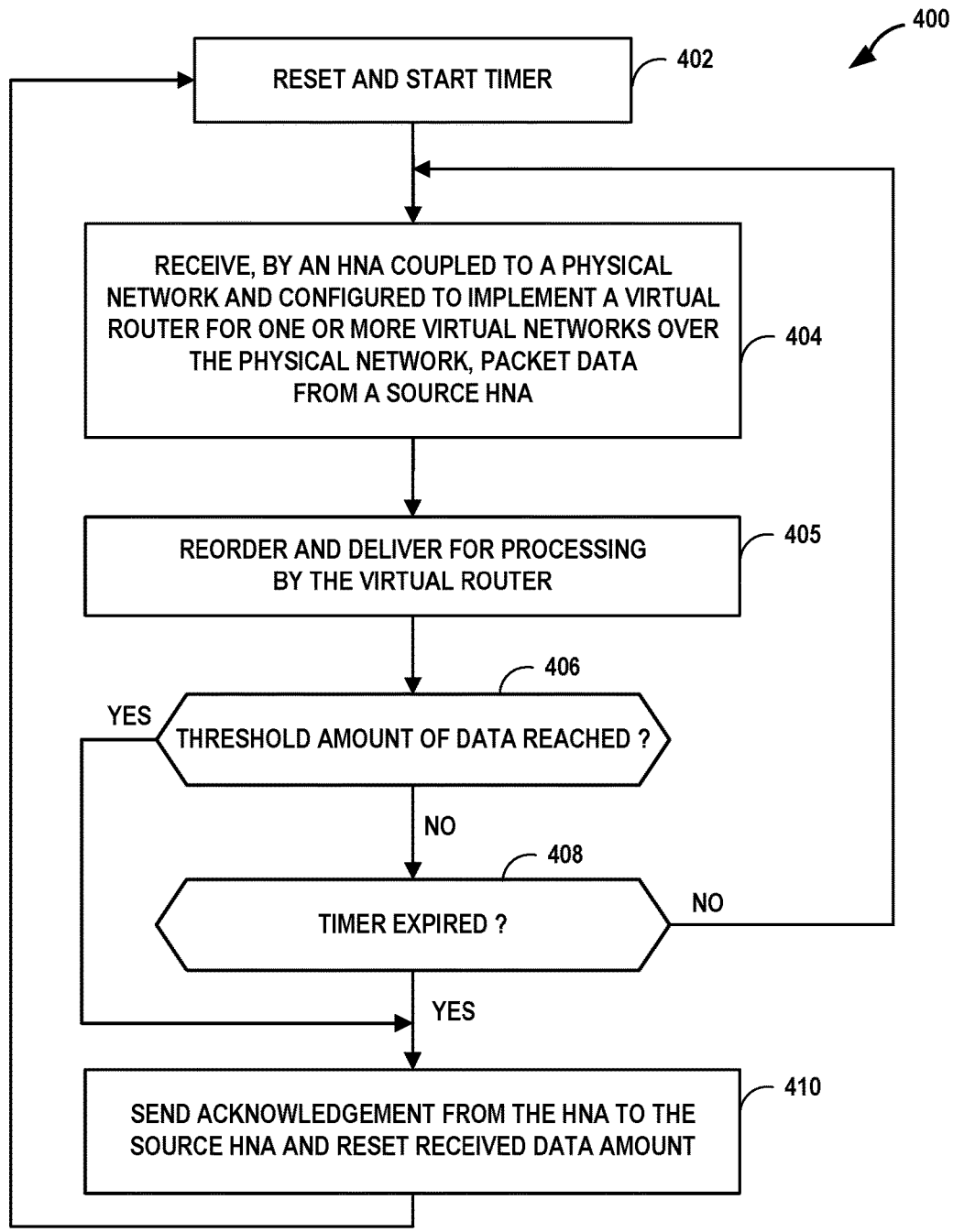
FIG. 13 is a flowchart illustrating an example mode of operation for a host network accelerator to perform flow control according to techniques described in this disclosure.

FIG. 13 is a flowchart illustrating an example mode of operation for a host network accelerator to perform flow control according to techniques described in this disclosure. This example mode of operation 400 is described with respect to computing device 100 of FIG. 4 including HNA 111. Flow control unit 149 unit resets a timer for receiving data from a source HNA to a configurable reset value and starts the timer to await data from the source HNA (402). HNA 111 is coupled to a physical network, e.g., switch fabric 14, and is configured to implement virtual router 128 for one or more virtual networks over the physical network. HNA 111 receives packet data sourced by the source HNA (404). HNA 111 includes a configurable threshold that specifies an amount of data received that triggers an acknowledgement. Flow control unit 149 may buffer the received packet data to memory 153 and reorder any number of packets received according to sequence numbers embedded in the tunnel header, e.g., sequence number 189, for priorities of the packets.

In addition, if the received packet data meets or exceeds the configurable threshold (YES branch of 406) or the timer expires (YES branch of 408), then flow control unit 149 sends an acknowledgement message to the source HNA and resets the received data amount to zero (410). The acknowledgement message may be a standalone message such as a heartbeat message 190 or may be included within a tunnel packet as flow control information field 185 and sequence number field 189. If, however, the timer expires (YES branch of 408), then flow control unit 149 sends an acknowledgement message to the source HNA and resets the received data amount to zero (410) regardless of whether the HNA 111 received the threshold amount of data within the timer period (NO branch of 406). After sending an acknowledgement, the HNA resets and restarts the timer (402).

Various embodiments of the invention have been described. These and other embodiments are within the scope of the following claims.

What is claimed is:

1. A server comprising:
a multi-core processor having a plurality of processing cores;
a plurality of virtual machines configured to execute on the multi-core processor;
a physical network interface to connect the server to a switch fabric comprising a plurality of switches that provide switching for packets through a physical network, wherein the physical network interface is coupled to the multi-core processor by a data path provided by an input/output (I/O) interface; and
a hardware-based virtual router executing within one or more integrated circuits positioned on the data path of the I/O interface between the physical network interface and the multi-core processor, the virtual router configured to apply routing information of a plurality of virtual networks to route packets between the physical network interface and the virtual machines configured to execute on the multi-core processor,
wherein the virtual router is configured to receive outbound packets from the server by the I/O interface and construct outbound tunnel packets in accordance with an overlay network extending across the switch fabric, wherein the outbound tunnel packets encapsulate the outbound packets, and
wherein the virtual router is configured to receive inbound tunnel packets from the switch fabric by the physical network interface, extract inner packets encapsulated within the inbound tunnel packets and route the inner packets to the virtual machines via the I/O interface in accordance with routing information for the virtual networks.

2. The server of claim 1, further comprising:
a plurality of outbound queues to buffer the outbound tunnel packets output by the virtual router; and
a scheduler that controls transmission of the outbound tunnel packets from the virtual router, via the switch fabric, to virtual routers executing within other servers coupled to the switch fabric.

3. The server of claim 2,
wherein the plurality of outbound queues comprises a plurality of sets of output queues, each of the sets of output queues buffering a respective set of the outbound tunnel packets that are to be sent to a corresponding one of the other virtual routers,
wherein each of the outbound queues within each of the respective sets of outbound queues is assigned a different priority, and
wherein, for each of the respective sets of outbound queues, the scheduler controls transmission of the outbound tunnel packets based on the respective priorities assigned to the outbound queues.

4. The server of claim 2, further comprising a flow control unit that exchanges flow control information with each of a set of the other virtual routers coupled to the switch fabric and positioned between the switch fabric and the remote servers,
wherein the scheduler controls transmission of the outbound tunnel packets from the virtual router to each of the other ones of the virtual routers based on the respective flow control information received from the other ones of the host network accelerators.

5. The server of claim 4, wherein the flow control information sent by the flow control unit to each of the other virtual routers specifies a maximum rate at which the respective virtual routers to which the flow control information is being sent is permitted to send tunnel packets to the virtual router.

6. The server of claim 5, wherein the flow control unit inserts the flow control information within the outbound tunnel packets constructed by the virtual router when encapsulating outbound packets from the virtual machines.

7. The server of claim 5, wherein the flow control unit inserts the flow control information into an outer header of the outbound tunnel packets constructed by the virtual router when encapsulating outbound packets from the virtual machines.

8. The server of claim 5, wherein, for each of the other virtual routers, the flow control unit sends a heartbeat message carrying the flow control information when the virtual router has not sent outbound tunnel packets to the respective virtual routers over the switch fabric for a threshold period of time.

9. The server of claim 1, wherein the network interface communicates the tunnel packets to the switch fabric using Internet Protocol over Ethernet (IPoE) protocols.

10. The server of claim 1, wherein the server provides an operating environment executing one or more virtual machines associated with one or more of the virtual networks.

11. The server of claim 1, wherein the server comprises a storage server.

12. The server of claim 1, further comprising a memory for storing the outbound packets as directly written into the memory by a processor of the server.

13. The server of claim 1, wherein the PCIe interface comprises a PCIe bus.

14. A method comprising:
receiving, from a processor of a server and by an input/output (I/O) interface coupled to the processor, a plurality of outbound packets;
selecting, with a hardware-based virtual router executing on one or more integrated circuits of a network interface card, destinations within virtual networks for the outbound packets, wherein the one or more integrated circuits of the network interface card are positioned on a data path between the I/O interface and a physical network interface provided by the network interface card;
constructing, with the virtual router, outbound tunnel packets based on the selected destinations and in accordance with an overlay network extending across a physical network to a plurality of other virtual routers executing within network interface cards deployed within other servers coupled to the physical network, wherein the outbound tunnel packets encapsulate the outbound packets; and
forwarding, by the physical network interface of the network interface card, the outbound tunnel packets to the physical network.

15. The method of claim 14, further comprising:
receiving, with the network interface card, flow control information from the network interface cards deployed within the other servers coupled to the physical network; and
controlling, with the network interface card, transmission of the outbound tunnel packets from the virtual router to other ones of the network interface cards based on the respective flow control information received from each of the other ones of the network interface cards.

16. The method of claim 14, further comprising, prior to forwarding the outbound tunnel packets to the network interface, inserting, with the virtual router, flow control information into outer headers of the outbound tunnel packets.

17. The method of claim 14, further comprising:
sending, to each of the other network interface cards, flow control information specifying a maximum rate at which the respective other network interface card is permitted to send tunnel packets to the network interface card.

18. The method of claim 16, further comprising sending, from the network interface card and to one of the other network interface cards, a heartbeat message carrying the flow control information when the virtual router has not sent outbound tunnel packets to the other one of the network interface cards over the switch fabric for a threshold period of time.

19. The method of claim 14, wherein receiving the outbound packets comprises receiving outbound packets written directly to memory of the integrated circuits.

* * * * *